(12) United States Patent  
Mizoguchi et al.

(10) Patent No.: US 7,006,362 B2  
(45) Date of Patent: Feb. 28, 2006

(54) DC/DC CONVERTER

(75) Inventors: Tomomichi Mizoguchi, Nagoya (JP); Koji Kawasaki, Nishio (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 112 days.

(21) Appl. No.: 10/675,553

(22) Filed: Sep. 30, 2003

(65) Prior Publication Data

US 2004/0066178 A1  Apr. 8, 2004

(30) Foreign Application Priority Data

Oct. 2, 2002 (JP) .............................. 2002-290285

(51) Int. Cl.  
  *H02M 3/335* (2006.01)  
  *G05F 1/40* (2006.01)
(52) U.S. Cl. ..................... 363/16; 363/17; 323/282; 323/271
(58) Field of Classification Search ............... 363/16, 363/17, 39, 40, 44–48, 19, 127; 323/281–287, 323/271–272  
See application file for complete search history.

(56) References Cited

U.S. PATENT DOCUMENTS 5,410,467 A * 4/1995 Smith et al. ................. 363/131

FOREIGN PATENT DOCUMENTS

| JP | 8-340676    | 12/1996 |
| JP | 2002-252965 | 9/2002  |
| JP | 2003-33013  | 1/2003  |

* cited by examiner

*Primary Examiner*—Rajnikant B. Patel

(74) *Attorney, Agent, or Firm*—Harness, Dickey & Pierce, PLC

(57) ABSTRACT

An auxiliary resonance type DC/DC converter which is compact, inexpensive and highly efficient is provided. In a step-down type DC/DC converter 15, comprising two main switches 1 and 2 connected between input terminals 11 and 12 and a smoothing reactor Lo connected between a junction M of the main switches 1 and 2 and an output terminal 14, an auxiliary resonance circuit 10 in which a resonance reactor Lr and an auxiliary switch 3 are connected in series is provided between the junction M and the output terminal 14 and, moreover, capacitors C1 and C2 for resonance are provided in parallel to the main switches 1 and 2, respectively. The auxiliary switch 3 is turned on when the main switch 2 is turned off and the main switch 1 is turned on, and the electrical energy is supplied from the output terminal 14 to the resonance reactor Lr, then, the main switch 1 is turned on when a voltage Vds across the main switch 1 falls to zero due to the resonance of Lr and C1 and C2.

20 Claims, 14 Drawing Sheets

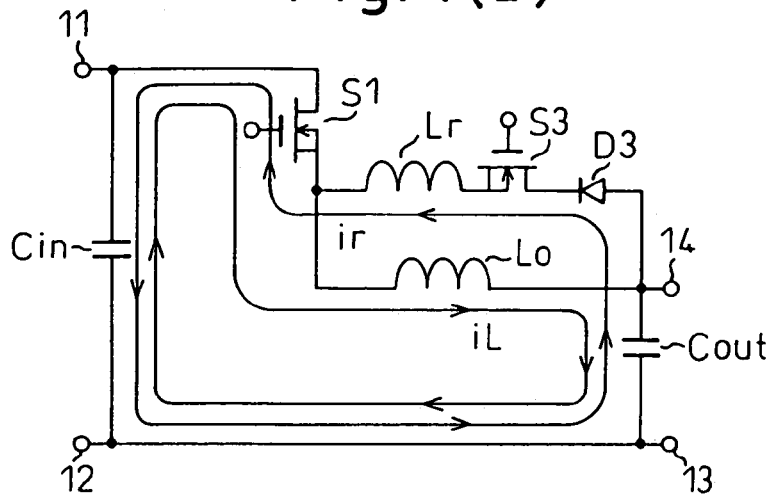
Fig.4(d')
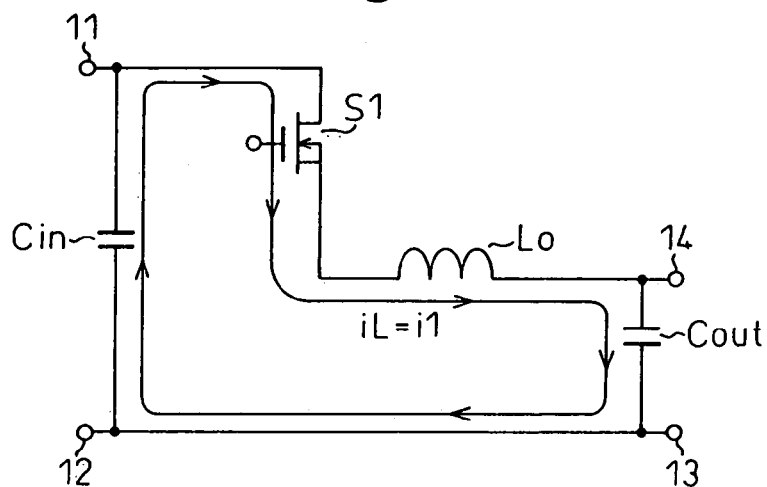
Fig.4(e)
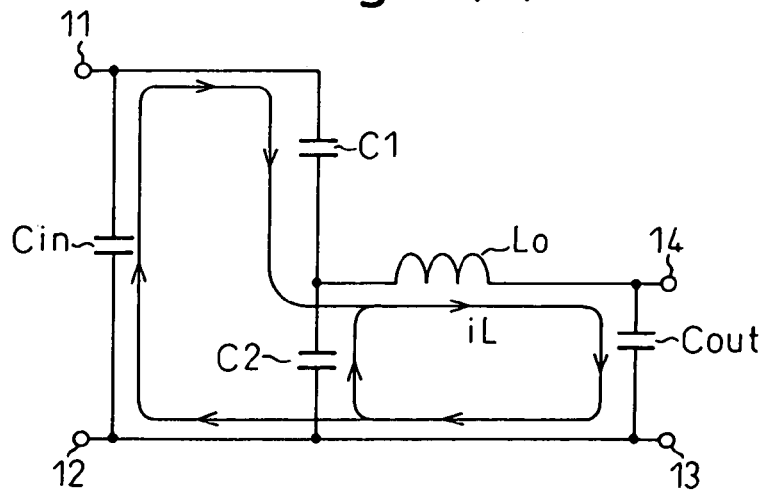
Fig.4(f)

DC/DC CONVERTER

BACKGROUND OF THE INVENTION

1. Field of the Invention

The present invention relates to a DC/DC converter.

2. Description of the Related Art

In order to reduce the size and improve the efficiency of a DC/DC converter which generates and outputs a direct current voltage, from an input direct current voltage, whose value of voltage is different from that of the input voltage, it is effective to reduce the switching loss of switching elements by using a soft switching technique, to increase the drive frequency accordingly, and by reducing the size of parts such as a smoothing reactor.

An auxiliary resonance type inverter, that is, an inverter which utilizes the soft switching technique, is widely known. In such an inverter, for example, zero voltage switching, that is, switching of a switching element in a state in which the voltage to be applied to the switching element is kept at zero, is achieved by utilizing the partial resonance of an auxiliary resonance circuit (refer to patent document 1, for example).

An example of a configuration in which the technique according to the above-mentioned patent document 1 has been applied to a DC/DC converter is shown in FIG. 14. A DC/DC converter 101 in FIG. 14 is a step-down type DC/DC converter, in which an output voltage Vout is smaller than an input voltage Vin.

The DC/DC converter 101 shown in FIG. 14 comprises two input terminals 11 and 12 to which a direct current power supply, which is an output power source of the input voltage Vin, is connected, two main switches 1 and 2 connected in series between the input terminals 11 and 12, capacitors C1 and C2 connected in parallel to the main switches 1 and 2, respectively, a smoothing reactor Lo, one end of which is connected to a junction M of the main switches 1 and 2, an output terminal 14 connected to the other end of the smoothing reactor Lo, an output terminal 13 connected commonly together with the input terminal 12, and an output filter capacitor Cout which is connected between the output terminals 13 and 14 and which suppresses variations in the output voltage Vout generated between the output terminals 13 and 14. In addition to the widely known configuration described above, the DC/DC converter 101 further comprises two middle potential generating capacitors (neutral point voltage clamp capacitor) Ca and Cb connected in series between the input terminals 11 and 12, and a resonance reactor Lr, a diode Dr and a switch Sr connected in this order in series between a junction N of the capacitors Ca and Cb and the junction M of the main switches 1 and 2.

In this configuration, the main switches 1 and 2 are each composed of transistors (N-channel MOSFET) S1 and S2 and parasitic diodes D1 and D2 which exist between the drain and the source of the transistors S1 and S2, respectively, and turning-on/off of each transistor S1 and S2 corresponds to turning-on/off of the main switches 1 and 2. On the other hand, as for the input terminals 11 and 12, the input terminal 11 plays the role of the plus terminal on the input side and the input terminal 12 plays the role of the minus terminal on the input side. Similarly, as for the output terminals 13 and 14, the output terminal 13 plays the role of the minus terminal on the output side and the output terminal 14 plays the role of the plus terminal on the output side.

Basically, in this DC/DC converter 101, a period of time (dead time) is provided, during which both the transistors S1 and S2 are maintained off, and the two transistors are turned on/off alternately and at the same time, when the transistor S1 is turned on, the electrical energy from the direct current power supply on the input side is stored in the smoothing reactor Lo and when the transistor S2 is turned on, the electrical energy stored in the smoothing reactor Lo is discharged to a load connected across the output terminals 13 and 14.

In this DC/DC converter 101, for example, when the transistor S2 is turned off and the transistor S1 is turned on (during the period of commutation from S2 to S1), the switch Sr is maintained on for a fixed period of time, the electrical energy is supplied from the above-mentioned junction N to the resonance reactor Lr, and the electrical energy stored therein is used for the resonance operation of the capacitors C1 and C2 and the resonance reactor Lr. After the capacitors C1 and C2 are discharged and charged by the resonance operation, between themselves and the resonance reactor Lr, and when it seems that the voltage between the drain and the source of the transistor S1 falls to zero, the transistor S1 is turned on, and in this way, the zero-voltage turn-on of the transistor S1 can be realized.

According to the soft switching of such an auxiliary resonance type (partial resonance type using an auxiliary resonance circuit), it is not necessary to raise the withstand voltage of each element because the resonance voltage does not exceed the input/output voltage. Moreover, there is an advantage that a PWM control in which the drive period of each transistor S1 and S2 is maintained constant can be carried out and at the same time that designing a noise filter is easy. In other words, in the case of the full resonance instead of a partial resonance, it is necessary to set the off time of the transistors S1 and S2 to a constant value, and change the drive period itself in order to change the duty ratio, therefore, designing an optimum noise filer is complicated, but partial resonance avoids such a problem.

[Patent Document 1]

Japanese Unexamined Patent Publication (Kokai) No. 8-340676

In the configuration shown in FIG. 14, however, it is necessary to newly generate a middle potential (neutral point voltage) which plays the role of the reference of the resonance voltage and the resonance current source, therefore, the two middle potential generating capacitors Ca and Cb are required on the input side, resulting in increase in size and cost of the circuit.

Moreover, in order to securely stabilize the middle potential, it is necessary to additionally provide two balancing resistors Ra and Rb in parallel to the capacitors Ca and Cb, respectively, therefore, the power efficiency is lowered because of the loss at the resistors Ra and Rb.

SUMMARY OF THE INVENTION

The object of the present invention is to provide an auxiliary resonance type DC/DC converter which is compact, inexpensive and highly efficient.

In a DC/DC converter according to a first aspect for attaining the above-mentioned object, two main switches connected in series are turned on/off alternately and at the same time when a first main: switch, which is one of the two main switches, is turned on, the electrical energy from a direct current power source connected to the terminal on the input side is stored in a smoothing reactor, and when a second main switch; which is the other of the two main switches, is turned on, the electrical energy stored in the smoothing reactor is discharged to a load connected to the terminal on the output side, as in a normal DC/DC converter.

Moreover, the DC/DC converter according to the first aspect is characterized in that it comprises an auxiliary resonance circuit in which a resonance reactor and an auxiliary switch are connected in series and, at the same time comprises a capacitive component in parallel to both the main switches or one of them and, particularly, in that, when the auxiliary switch is on, the electrical energy is supplied from the terminal on the output side to the resonance reactor and the electrical energy stored therein is used for the resonance operation of the capacitive component and the resonance reactor.

According to the DC/DC converter of the first aspect, the need for parts such as middle potential generating capacitors and resistors can be obviated because the resonance current to the resonance reactor is supplied from the output side instead of the input side as the prior art, therefore, it is possible to reduce the size and cost of the circuit. In other words, this is because the potential on the output side (the output voltage of the DC/DC converter) is controlled so as to be constant by the original function of the DC/DC converter, therefore, it is possible to maintain the reference potential of the resonance voltage constant without additionally providing special parts.

Moreover, the need for the middle potential stabilizing resistor (balancing resistor) can be obviated and the power loss at the resistor can be avoided, therefore, a higher efficiency can be attained.

A DC/DC converter according to a second aspect is configured so that an output filter capacitor is connected to the terminal on the output side to suppress variations in the output voltage and the electrical energy, which is supplied from the terminal on the output side to the resonance reactor when the auxiliary switch is on, is supplied from the output filter capacitor in the DC/DC converter of the first aspect.

According to the DC/DC converter of the second aspect, it is possible to securely supply the electrical energy to the resonance reactor even if the load to be connected to the terminal on the output side is not a capacitive load (load having an electrostatic capacitance). Conversely speaking, it is possible to obviate the need for the output filter capacitor if a load has a sufficiently large electrostatic capacitance.

In the DC/DC converter according to the first or second aspect, in order to achieve the zero voltage switching of the first main switch, it is necessary to provide a dead time during which both the first and the second main switches are maintained off and, at the same time, to control the auxiliary switch so as to be maintained on at least during the period from turning-off of the second main switch to turning-on of the first main switch, as described in a third aspect.

Particularly as described in a fourth aspect, by turning the auxiliary switch on in the period during which the second main switch is on, and at the same time by turning the auxiliary switch off in the period during which the first main switch is on, and moreover, if the direction in which a current flows through the second main switch when only the second main switch is on is assumed to be the positive direction, by turning the second main switch off when the current which flows through the second main switch falls to zero or becomes negative in the period during which the second main switch and the auxiliary switch are on at the same time, it is possible to boost the resonance voltage of the resonance reactor and the capacitive component and the zero-voltage switching of the first main switch can be achieved without fail even if the DC/DC converter is a step-down type in which the output voltage Vout is equal to or lower than half the input voltage Vin as described in an eighth aspect, or a step-up type in which the output voltage Vout is equal to or lower than two times the input voltage Vin as described in a ninth aspect, or a reversal type in which the absolute value of the output voltage Vout is equal to or lower than the absolute value of the input voltage Vin as described in a tenth aspect.

In order to achieve the zero-voltage turn-on switching of the first main switch in the DC/DC converter of the fourth aspect, it is necessary to follow the procedure described in a fifth aspect. In other words, if the direction in which a current flows through the first main switch when only the first main switch is on is assumed to be the positive direction, the first main switch should be turned on when the current which flows through the first main switch becomes negative or falls to zero.

Next, a DC/DC converter according to a sixth aspect is characterized by comprising a smoothing reactor current measuring means for measuring a current iL which flows through a smoothing reactor and by turning the second switch off when a period of time T1 during which the second main switch and the auxiliary switch are on at the same time meets the condition of Expression 1 described in the sixth aspect in the DC/DC converter of the fourth or fifth aspect.

According to this DC/DC converter, it is possible to actively optimize the period during which the second main switch and the auxiliary switch are maintained on at the same time in accordance with the actual smoothing reactor current (in other words, a load current) iL and as a result, it is possible to prevent the wasteful power loss from occurring in the auxiliary resonance circuit.

Next, a DC/DC converter described in a seventh aspect is characterized by comprising a smoothing reactor current measuring means for measuring the current iL which flows through the smoothing reactor and a resonance reactor current measuring means for measuring a current ir which flows through a resonance reactor and by turning the second main switch off when the resonance reactor current ir meets the condition of Expression 2 described in the seventh aspect in the period during which the second main switch and the auxiliary switch are maintained on at the same time in the DC/DC converter of the fourth or fifth aspect.

According to this DC/DC converter, it is possible to optimize the period during which the second main switch and the auxiliary switch are maintained on at the same time in accordance with the actual smoothing reactor current iL and the resonance reactor current ir more precisely than the case of the DC/DC converter of the sixth aspect.

On the other hand, if the DC/DC converter according to any one of the first to eighth aspects is a step-down type (DC/DC converter in which the output voltage is smaller than the input voltage), by connecting an input filter capacitor between the plus terminal on the input side (one of the input terminals, whose potential is higher than the other) and the plus terminal of the output filter capacitor in the present DC/DC converter, as described in an eleventh aspect, it is possible to lower the withstand voltage of the input filter capacitor and also reduce the size of the input filter capacitor because the input filter capacitor and the output filter capacitor are connected in series and the output filter capacitor plays the role of the input filter capacitor also.

Moreover, if the DC/DC converter according to any one of the first to seventh aspects or the ninth aspect is a step-up type (DC/DC converter in which the output voltage is larger than the input voltage), by connecting an output filter capacitor between the plus terminal on the output side (one of the output terminals, whose potential is higher than the other) and the plus terminal of the input filter capacitor in the present DC/DC converter, as described in a twelfth aspect, it is possible to lower the withstand voltage of the output filter capacitor and also reduce the size of the output filter capacitor because the output filter capacitor and the input filter capacitor are connected in series and the input filter capacitor plays the role of the output filter capacitor also.

Next, a DC/DC converter described in a thirteenth aspect is characterized in that the auxiliary switch in the DC/DC converter of any one of the first to twelfth aspects is a bidirectional switch capable of allowing a current to flow bidirectionally and in that the present DC/DC converter is a bidirectional type in which it is possible to reverse the input side and the output side by reversing one of the two main switches, which is to function as the first main switch, and the other main switch to function as the second main switch.

According to this DC/DC converter, it is possible to achieve soft switching using the partial resonance of the auxiliary resonance circuit even if either input/output direction is selected.

Next, in a DC/DC converter described in a fourteenth aspect, the auxiliary switch in the DC/DC converter of any one of the first to twelfth aspects is composed of two unidirectional switches capable of allowing currents to flow only in the directions opposite to each other, respectively, and at the same time by turning on one of the two unidirectional switches, a current flows only in the direction specified by the unidirectional switch turned on. Moreover, the present DC/DC converter is a bidirectional type in which it is possible to reverse the input side and the output side by reversing one of the two main switches, which is to function as the first main switch, and the other main switch to function as the second main switch, and at the same time to operate only one of the two unidirectional switches according to the input/output direction.

As in the DC/DC converter of the thirteenth aspect, even in the DC/DC converter of the fourteenth 14, it is possible to achieve soft switching using the partial resonance of the auxiliary resonance circuit regardless of the input/output direction.

Next, a DC/DC converter described in a fifteenth aspect is characterized in that the second main switch is turned on when a period of time T2 which meets the condition of Expression 3 described in the fifteenth aspect elapses after the first main switch is turned off in the DC/DC converter of the first to fourteenth aspects.

According to this DC/DC converter, it is possible to achieve the zero-voltage turn-on switching of the second main switch without fail.

In the DC/DC converter of any one of the first to fifteenth aspects, it is also possible to provide a capacitive component in parallel to the auxiliary resonance circuit instead of the capacitive component in parallel to the main switch, as described in a sixteenth aspect.

Moreover, in the DC/DC converter of any one of the first to third aspects, it is possible to compose the second main switch of only passive switches such as a flywheel diode, as described in a seventeenth aspect.

BRIEF DESCRIPTION OF THE DRAWINGS

FIG. 4(d')–FIG. 4(f) are diagrams 2 illustrating the operation of the DC/DC converter in FIG. 1;

DESCRIPTION OF THE PREFERRED EMBODIMENTS

The DC/DC converters in the embodiments to which the present invention has been applied are described below by using the drawings.

(First Embodiment)

Figure 1:
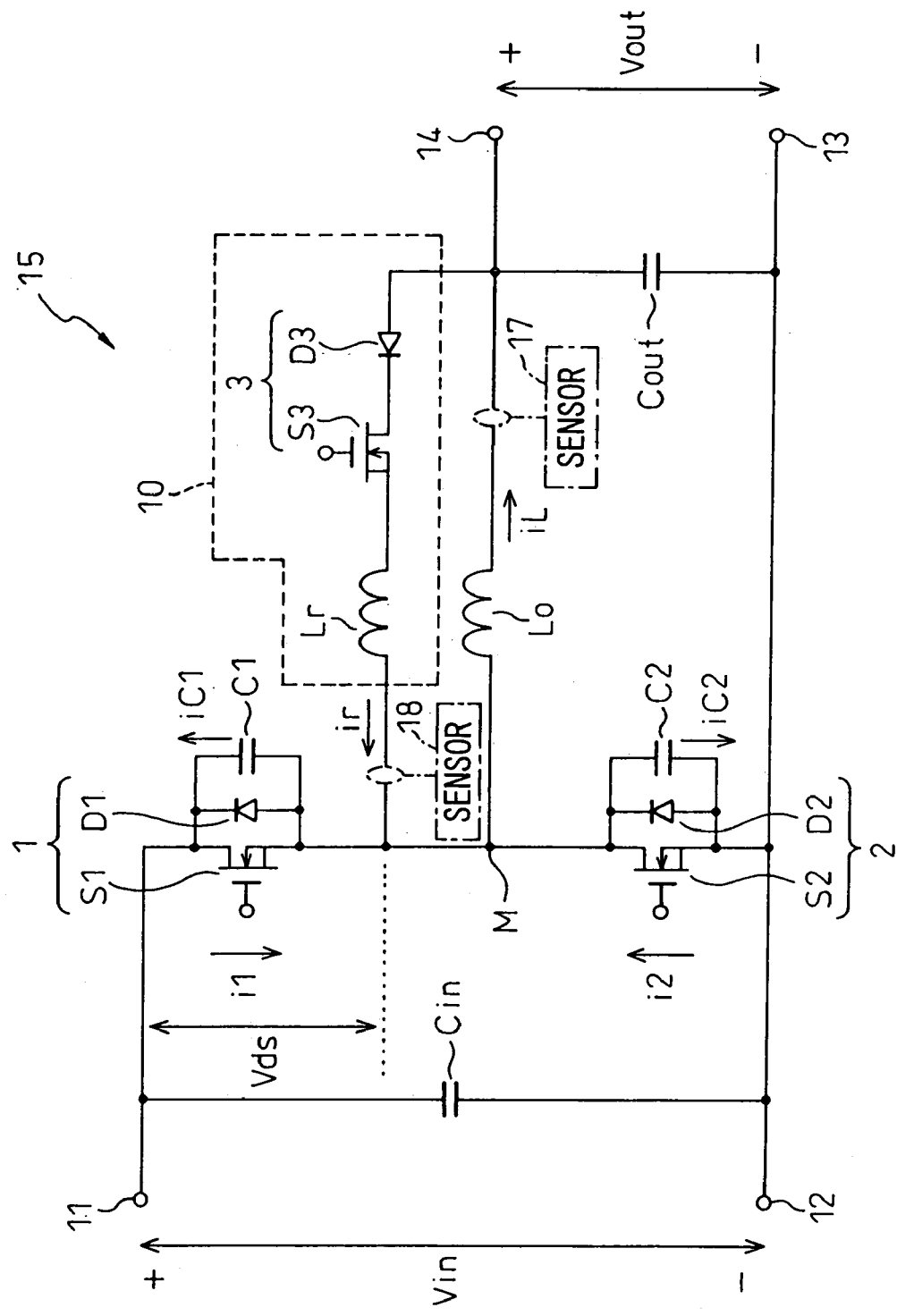
FIG. 1 is a circuit diagram showing the configuration of a step-down type DC/DC converter according to a first embodiment.

FIG. 1 is a circuit diagram showing the configuration of a DC/DC converter 15 according to the first embodiment.

Figure 14:
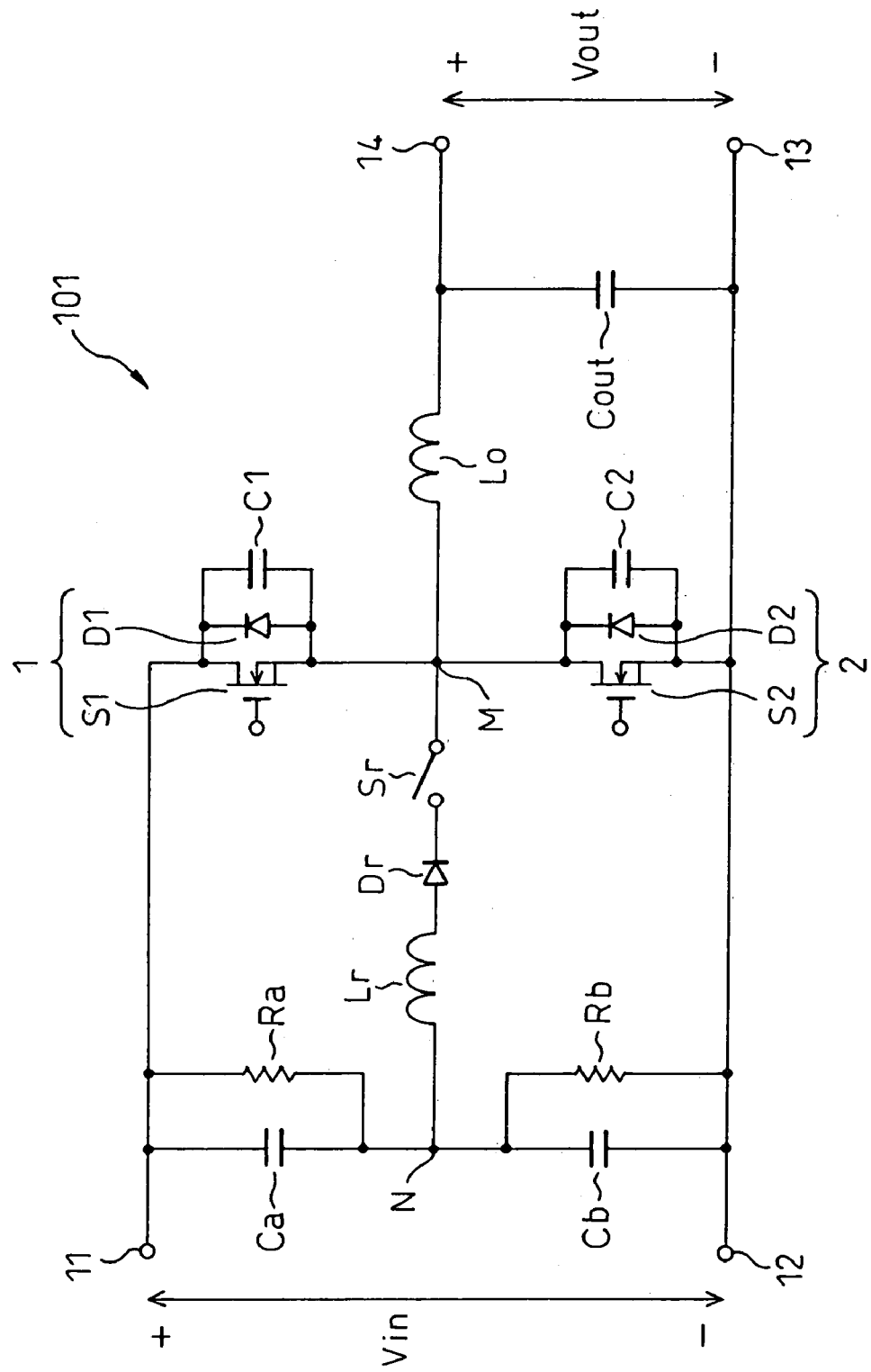
FIG. 14 is a diagram showing the prior art.

As shown in FIG. 1, the DC/DC converter 15 according to the first embodiment is a step-down type DC/DC converter similar to the DC/DC converter 101 shown in FIG. 14 but differs from the DC/DC converter 101 in FIG. 14 in the following points (1-1) and (1-2) described below. In FIG. 1, the same parts as those of the DC/DC converter 101 in FIG. 14 are marked with the same symbols, therefore, no detailed description is given here.

(1-1): The two middle potential generating capacitors Ca and Cb and the resistors Ra and Rb are not provided between the input terminals 11 and 12 and, instead, an input filter capacitor Cin is connected.

The input filter capacitor Cin is necessary to absorb the high-frequency noises (so-called surge) from the terminal 11, but if the withstand voltage of the elements such as the main switches 1 and 2 is high enough, it can be eliminated.

(1-2): An auxiliary resonance circuit 10 in which the resonance reactor Lr and an auxiliary switch 3 are connected in series is provided between the junction M of the main switches 1 and 2 and the output terminal 14. The auxiliary switch 3 shuts off a current which flows in both directions when it is off and when on, it functions as a unidirectional switch which allows only a current flowing in the direction from the output terminal 14 toward the junction M, and is composed of a transistor (N-channel MOSFET) S3 and a parasitic diode D3 thereof in the present embodiment.

Because of this, turning-on/off the transistor S3 corresponds to turning-on/off the auxiliary switch 3 in the present embodiment.

In this DC/DC converter 15 also, the capacitors C1 and C2 are connected in parallel to the main switches 1 and 2 (transistors S1 and S2), respectively, but it is possible to use the floating capacitance of the transistors S1 and S2 instead of the capacitors C1 and C2 for resonance in order to reduce the number of parts. It is also possible to additionally provide a new capacitor in order to design the resonance frequency precisely. Moreover, although the capacitors C1 and C2 are connected to both the main switches 1 and 2 in the present embodiment because these capacitors play the role of snubbers to suppress noises, it is possible to connect them only to one of the main switches 1 and 2 if there is no problem of noises. The capacitances of the capacitors C1 and C2 can be the same or different from each other. On the other hand, it is possible to use different kinds of switching elements such as IGBT's and bipolar transistors for the transistors S1 to S3, not limited to MOSFET'S.

The operations of the DC/DC converter 15 having the above-mentioned configuration are described below by using FIG. 2 to FIG. 4.

Figure 2:
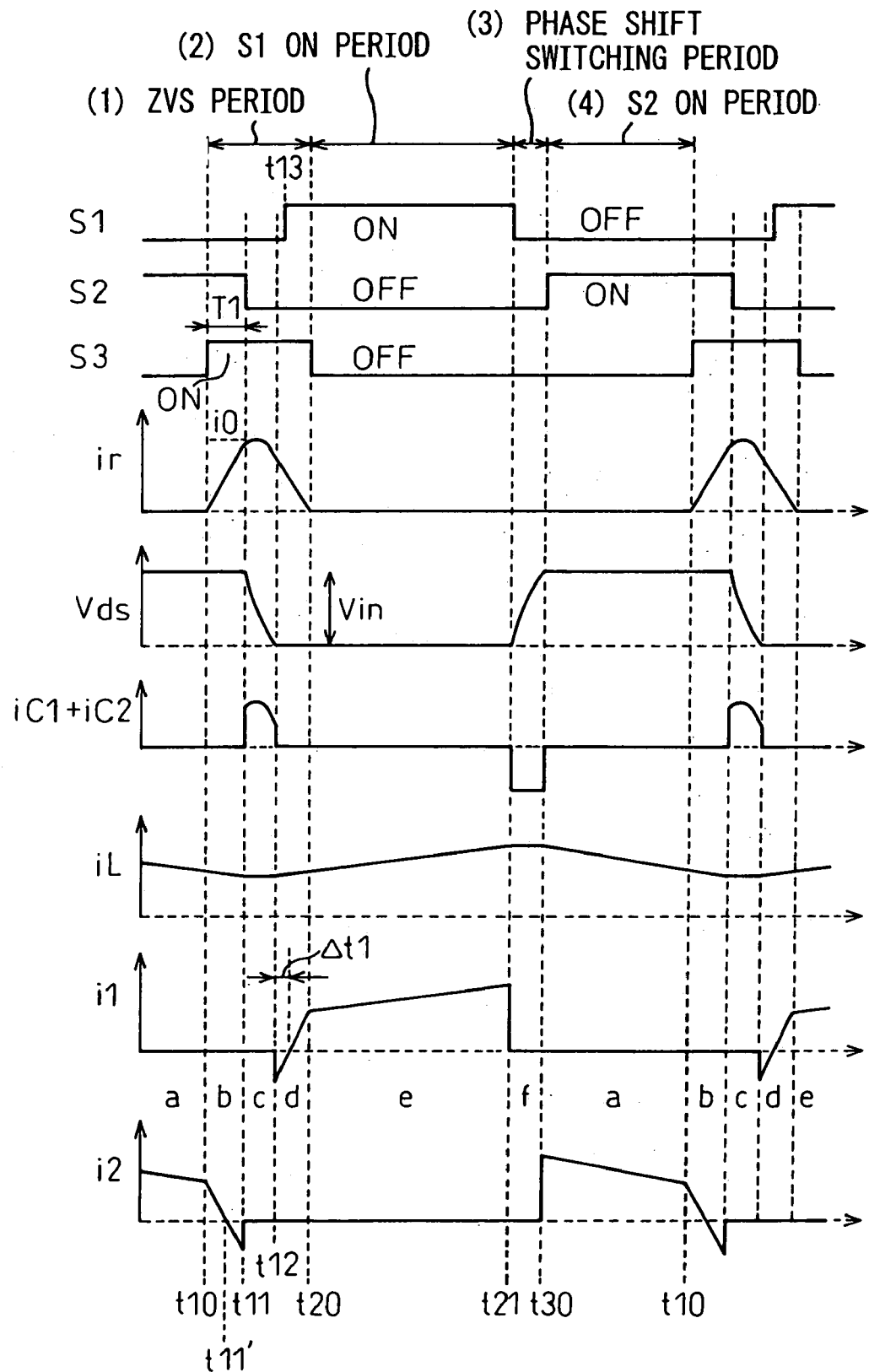
FIG. 2 is a time chart showing the operation of the DC/DC converter in FIG. 1.

FIG. 2 shows the timing with which a control circuit (not shown) composed of a microcomputer or the like as a main part turns on/off the transistors S1, S2 and S3, respectively, and the current or the voltage in each main element shown in FIG. 1.

FIGS. 3(*a*)–3(*d*) and FIGS. 4(*d'*)–4(*f*) are diagrams that show the current path in each period of time a to f in FIG. 2, but elements through which no current flows are not shown in FIGS. 3(*a*)–3(*d*) and FIGS. 4(*d'*)–4(*f*). Currents smoothed respectively in the filter capacitors Cin and Cout flow through a direct current power supply (input side direct current power supply) connected between the input terminals 11 and 12 and through an electrical load connected across the output terminals 13 and 14, but they are not shown here for simplification of the description. It is assumed that the input voltage Vin across the input terminals 11 and 12 and the output voltage Vout across the output terminals 13 and 14 have constant values, respectively.

In FIG. 2 to FIG. 4(*f*) and in the following description and each Expression (Expression 4 to Expression 12), "iL" is a current (smoothing reactor current) which flows through the smoothing reactor Lo, "ir" is a current (resonance reactor current) which flows through the resonance reactor Lr and the auxiliary switch 3, "i1" is a current which flows through the main switch 1, "i2" is a current which flows through the main switch 2, "iC1" is a current which flows through the capacitor C1, and "iC2" is a current which flows through the capacitor C2. The direction in which these currents iL, ir, i1, i2, iC1 and iC2 flow is assumed to be the positive direction when they flow in the direction shown by the arrow in FIG. 1.

On the other hand, in each Expression (Expression 4 to Expression 12) below, "Lr" is the inductance of the resonance reactor Lr, "C1" is the electrostatic capacitance of the capacitor C1, and "C2" is the electrostatic capacitance of the capacitor C2. In addition, in each Expression below and in the following description, "V1" is a voltage to be applied to the smoothing reactor Lo when the transistor S1 is turned on, and "V2" is a voltage to be applied to the smoothing reactor Lo when the transistor S2 is turned on. As the DC/DC converter in the first embodiment is a step-down type, "V1=Vin−Vout" and "V2=Vout" hold.

As shown in FIG. 2, in the DC/DC converter 15 according to the first embodiment, the transistor S1 and the transistor S2 are turned on/off alternately and when the on-states and the off-states of the transistors S1 and S2 are switched (during the period of commutation), a dead time during which both the transistors S1 and S2 are off is provided, that is, after the transistor S2 is turned off the transistor S1 is turned on, and after the transistor S1 is turned off the transistor S2 is turned on. In the period during which the transistor S2 is on, the transistor S3 of the auxiliary switch 3 is turned on, and the transistor S3 is turned off in the period during which the transistor S1 is turned on and maintained on.

Immediately before the time t10 in FIG. 2 when the transistor S3 is turned on (to be precise, the period a from turning-on the transistor S2 to turning-on the transistor S3), only the transistor S2 among the transistors S1 to S3 is on as shown in FIG. 3(*a*), therefore, only the flyback current iL of the smoothing reactor Lo flows. In the period a during which only the transistor S2 is on, the electrical energy stored in the smoothing reactor Lo is discharged to the output side (to be precise, a load connected across the output terminals 13 and 14), which is one of the operations of a normal DC/DC converter.

Next, when the transistor S3 is turned on at the time t10 in FIG. 2, the current ir flows through the resonance reactor Lr via the auxiliary switch 3 (D3, S3), as shown in FIG. 3(*b*), and the resonance reactor Lr is supplied with the electrical energy from the output terminal 14, or to be precise, from the output filter capacitor Cout (or a load, in addition) connected across the output terminals 13 and 14.

The value of i0 the resonance reactor current ir at the time t11 when the transistor S2 is turned off (that is, the resonance reactor current ir immediately before the transistor S2 is turned off) is expressed by Expression 4, therefore, the longer the period from the time t11 to the time t10 (that is, the period "t11−t10=T1" during which both the transistor S2 and the transistor S3 are on at the same time), the larger the electrical energy (corresponding to i0 in Expression 4) stored in the resonance reactor Lr becomes.

$$V2 = Lr\ i0/(t11-t10) \qquad \text{Expression 4}$$

It is desirable to set the inductance of the resonance reactor Lr to a value lower than the inductance of the smoothing reactor Lo.

This is because if the inductance of the resonance reactor Lr is large, the proportion of the period during which the resonance reactor current ir flows (period between the times t10 and t11 in FIG. 2 or period between the times t12 and t20, which will be described later) to the whole of one period becomes large, therefore, the loss at the diode 3 and the transistor S3 becomes large due to the resonance reactor current ir. In other words, if the inductance of the resonance reactor. Lr is large, the slope with which the resonance reactor current ir increases or decreases becomes flatter, therefore, if i0 in Expression 4 is increased to a value necessary for soft switching, the power loss at the auxiliary switch 3 becomes large. Therefore, in the present embodiment, the inductance of the resonance reactor Lr is set to a value equal to or lower than one tenth the inductance of the smoothing reactor Lo.

If the transistor S2 is turned off before the time t11' (when i2 decreases and falls to zero) in FIG. 2, that is, if the period between the times t10 and t11 is shorter than the period between the times t10 and t11, i0 is smaller than iL in Expression 4 but in this case i2 (=iL−ir) still remains positive and i2 continues to flow through the diode D2 until it falls to zero, therefore, i0 becomes equal to iL because the same state as that in which the transistor S2' is turned off at the time till is established. This means that even if the transistor S2 is turned off before the time t11', the operation is the same as that when i0=iL.

Figure 3A:
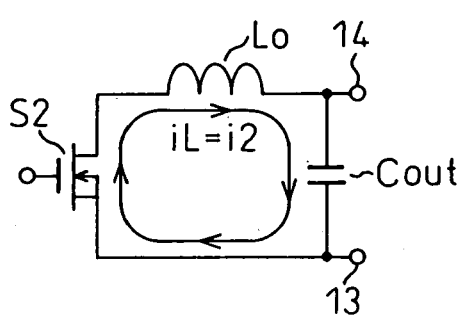
FIG. 3(a)–FIG. 3(d) are diagrams 1 illustrating the operation of the DC/DC converter in FIG. 1.
Figure 3B:
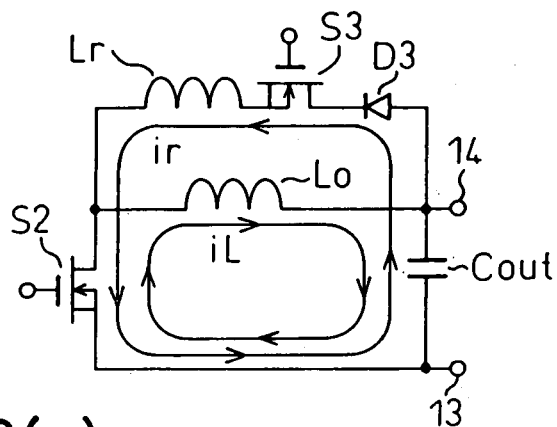
Figure 3C:
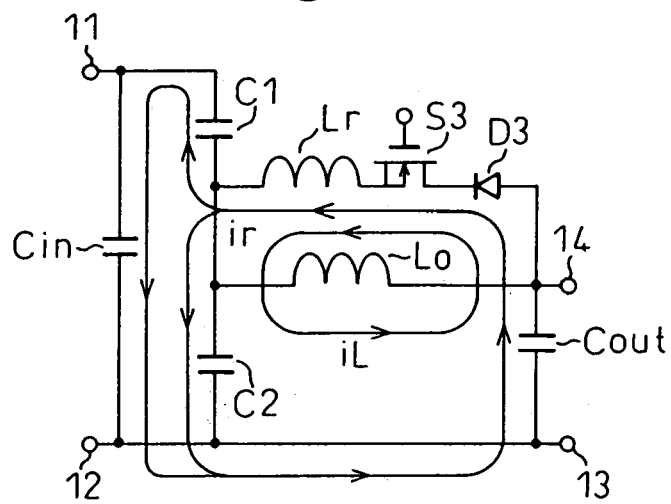

Next, if the transistor S2 is turned off at the time t11 FIG. 2, a resonance operation of the resonance reactor Lr and the capacitors C1 and C2 occurs as shown in FIG. 3(c), and the resonance reactor current ir is distributed to the smoothing reactor current iL and the resonance capacitor currents iC1 and iC2. The initial value of the resonance reactor current ir is i0.

At this time, because the inductance of the smoothing reactor Lo is larger enough than the inductance of the resonance reactor Lr, as described above, it is possible to regard iL as almost constant during the period from the time when the transistor S2 is turned off to the time when the potential difference Vr across the capacitor C2 reaches Vin (=V1+V2). Therefore, the resonance reactor current ir in this case is expressed by the following Expression 5 and the potential difference Vr across the resonance capacitor C2 is expressed by the following Expression 6. In both Expression 5 and Expression 6, it is assumed that t11=0 (that is, the timing with which the transistor S2 is turned off is taken as the original point of the time t). In addition, α and β in Expression and Expression 6 are expressed in Expression 7 and Expression 8, respectively.

$$ir=\{(i0-iL)^2+V2^2(C1+C2)/Lr \cos(\beta t-\alpha)\}^{1/2} \quad \text{Expression 5}$$

$$Vr=V2+\{V2^2+Lr(i0-iL)^2/(C1+C2)\}^{1/2} \sin(\beta t-\alpha) \quad \text{Expression 6}$$

$$\alpha=\tan^{-1}(V2/(i0-iL)(C1+C2/Lr)^{1/2} \quad \text{Expression 7}$$

$$\beta=\{1/Lr(C1+C2)\}^{1/2} \quad \text{Expression 8}$$

According to Expression 6, the condition of the following Expression 9 is required to achieve the zero-voltage switching of the transistor S1. The right-hand side of Expression 9 corresponds to the maximum of Vr.

$$V1+V2<V2+\{V2^2+Lr(i0-iL)^2/(C1+C2)\}^{1/2} \quad \text{Expression 9}$$

This is because if the condition of Expression is not met, the voltage Vr (voltage at the junction M) of the capacitor C2 does not exceed Vin (=V1+V2) and the potential difference Vds across the transistor S1 (voltage between drain and source) does not fall to zero volts.

When Expression 9 is expanded, the following Expression 10 is obtained and if the period between the times t10 and t11 in FIG. 2 (that is, the period of time T1 during which both the transistor S2 and the transistor S3 are on at the same time) is controlled so as to meet the condition of Expression 10, it is possible to achieve the zero-volt switching of the transistor S1.

$$i0>iL+\{(C1+C2)/Lr(V1^2-V2^2)\}^{1/2} \quad \text{Expression 10}$$

In the present embodiment, therefore, a sensor 17 (corresponding to the smoothing reactor current measuring means) for measuring the current iL which actually flows through the smoothing reactor Lo and a sensor 18 (corresponding to the resonance reactor current measuring means) for measuring the current ir which actually flows through the resonance reactor Lr are provided as shown by the alternate long and short dash lines in FIG. 1, and the control circuit is designed so as to turn off the transistor S2 when the current ir detected by the sensor 18 exceeds the value of the right-hand side of Expression 10 in the period during which both the transistor S2 and the transistor S3 are on at the same time (that is, when the condition of Expression 2 described in the seventh aspect is met). In this case, iL in the right-hand side of Expression 10 to be used is an actually measured value by the sensor 17.

Due to the above-mentioned control, it is possible to achieve the zero-voltage turn-on switching of the transistor S1, without fail, by increasing i0, which is the resonance reactor current ir immediately before the transistor S2 is turned off, so as to be larger than the value of the right-hand side of Expression 10.

Even if the period of time T1 (period between the times t10 and t11) during which the transistors S2 and S3 are on at the same time is fixed and i0 is also fixed, when the load is small (under a low-load condition), iL decreases and never fails to satisfy Expression 10, therefore, even if the period of time T1 during which the transistors S2 and S3 are on at the same time is obtained in advance as a fixed value so that the following Expression 11 derived from Expression 4 and Expression 10 (that is, the same as Expression 1 described in the first aspect, in which T1 is described as "t11-t10") is satisfied even at the maximum output power, it is possible to achieve zero-voltage switching under the required output condition when Ti is determined in advance in designing in this way, iL in Expression 11 can be equal to a value at the maximum output power (equal to the output current in the case of a step-down type DC/DC converter).

$$t11-t10>Lr/V2[iL+\{(C1+C2)/Lr(V1^2-V2^2)\}^{1/2}] \quad \text{Expression 11}$$

The fact that i0 does not change (is fixed) even when the load is small means that the conduction loss at the auxiliary resonance circuit 10 does not change, therefore, if a higher efficiency is aimed at when the load is small, it is possible to design a configuration in which only the sensor 17 is provided, not the sensor 18, and the transistor S2 is turned off when the period of time T1 (="t11-t10") during which the transistors S2 and S3 are on at the same time meets the condition of Expression 11. In such a configuration, although the accuracy is degraded more or less compared to the case where the two sensors 17 and 18 are provided, it is possible to actively optimize the period of time T1 during which the transistors S2 and S3 are on at the same time and the value of i0 in accordance with the actual smoothing reactor current (load current) iL, and prevent wasteful power loss from occurring at the auxiliary resonance circuit 10.

However, Expression 10 in itself is a condition for minimizing the switching loss of the transistor S1, as described above and, therefore, there may be cases where the loss of the entire circuit is not necessarily minimized. This is because when the period of time T1 during which the transistors S2 and S3 are on at the same time is lengthened, the effective values of ir, i1 and i2 which flow during this period of time increase and the conduction loss of each switching element increases accordingly. Particularly when the resistance of the transistor S3 and the on-state voltage (forward drop voltage) of the diode D3 increase, this trend becomes more outstanding and in this case, the loss of the entire circuit may be minimized even when the period of time T1 during which the transistors S2 and S3 are on at the same time is a small value which does not meet Expression 10.

Figure 3D:
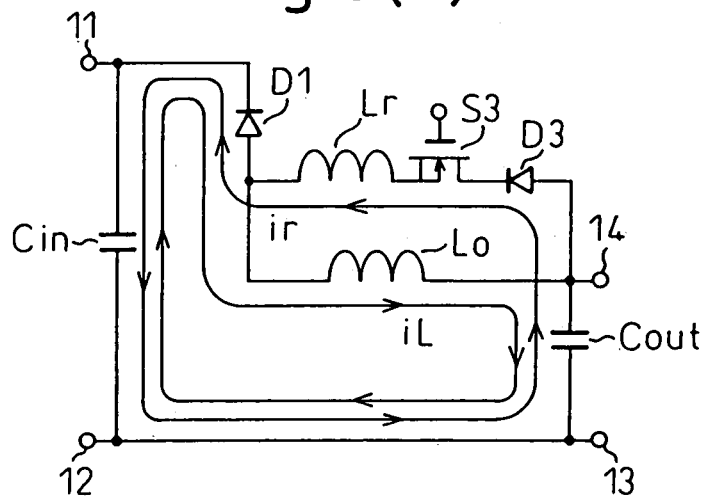

At the time t12 in FIG. 2, the potential difference (voltage at the junction M) Vr across the capacitor C2 reaches Vin and the potential difference Vds across the transistor S1 falls to zero. Therefore, the diode D1 is turned on (a forward current flows through the diode D1), no current flows through the capacitor C1, and the resonance is terminated, as shown in FIG. 3(d).

In the present DC/DC converter 15, the transistor S1 is maintained on while the diode D1 is on, as described above, therefore, the zero-voltage switching of the transistor S1 is achieved as shown in FIG. 4(d'). That is, the timing with which the transistor S1 is turned on to achieve zero-voltage switching (t13 in FIG. 2) can be while il is negative or when it falls to zero, corresponding to the period of time Δt1 in FIG. 2.

When a fixed time elapses after the timing with which the transistor S2 is turned off (time t11) and at the same when the diode D3 is turned off and ir is regarded as zero (time t20 in FIG. 2), the transistor S3 is turned off.

Then, a state in which only the transistor S1 is on is established as shown in FIG. 4(e), and the present DC/DC converter 15 stores the electrical energy from the input side direct current power supply in the smoothing reactor Lo, which is one of the operations of a normal DC/DC converter.

In the configuration of the transistor S3 and the diode D3, as the switch 3 in FIG. 1, the timing with which S3 is turned off can be selected from between t20 and t21 in FIG. 2. This is because the potential of the junction M is Vin while S1 in FIG. 1 is on and after t20 when the resonance reactor current ir falls to zero, the diode D3 is reverse-biased, therefore, ir falls to zero regardless of the state of S3. By the way, if the timing with which the S3 is turned off is before t20, the switching loss occurs at S3 because ir flows therethrough. After t21, ir flows when the diode D3 is forward-biased, resulting in malfunctions.

If the transistor S1 is turned off at the time t21 in FIG. 2, a current flows as shown in FIG. 4(f). In this case also, because the inductance of the smoothing reactor Lo is larger enough than the inductance of the resonance reactor Lr, as described above, the period ("t30–t21") from the timing t21 with which the transistor S1 is turned off to the time t30 when the potential difference vr across the capacitor C2 falls to 0V (in other words, Vds=Vin holds) is negligibly small compared to the resonance period of the smoothing reactor Lo and the capacitors C1 and C2, and it is possible to regard iL as constant. Therefore, the period "t30–t21" from the time when the transistor S1 is turned on to the time when Vr falls to 0V can be expressed by Expression 12 as below.

$$t30-t21=(C1+C2)(V1+V2)/iL \qquad \text{Expression 12}$$

If the timing with which the transistor S2 is turned on is taken before the time t30 in FIG. 2, the zero-voltage switching of the transistor S2 cannot be achieved. If the timing with which the transistor S2 is turned on is taken far behind the time t30, the conduction loss at the diode D2 increases.

Therefore, it is desirable to take the timing for turning the transistor on after the time t30, and if possible immediately after the time t30.

In the present DC/DC converter 15, after the transistor S1 is turned off and when the time expressed by the right-hand side of Expression 12 elapses (that is, when the period of time T2 which meets the condition of Expression 3 described in the fifteenth aspect elapses), the transistor S2 is turned on.

Figure 5:
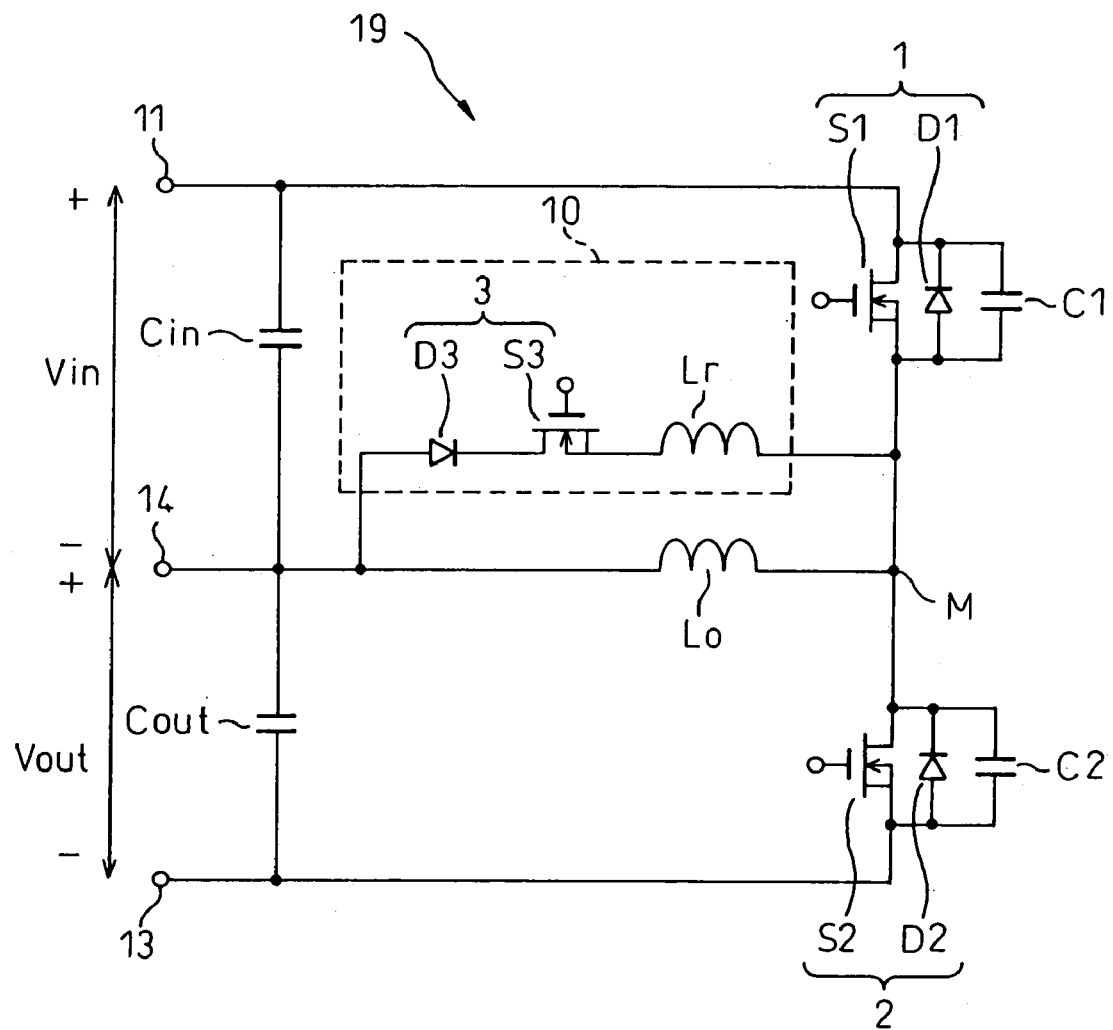
FIG. 5 is a circuit diagram showing the configuration of a reversal type DC/DC converter which is a modification of the DC/DC converter in FIG. 1.
Figure 6:
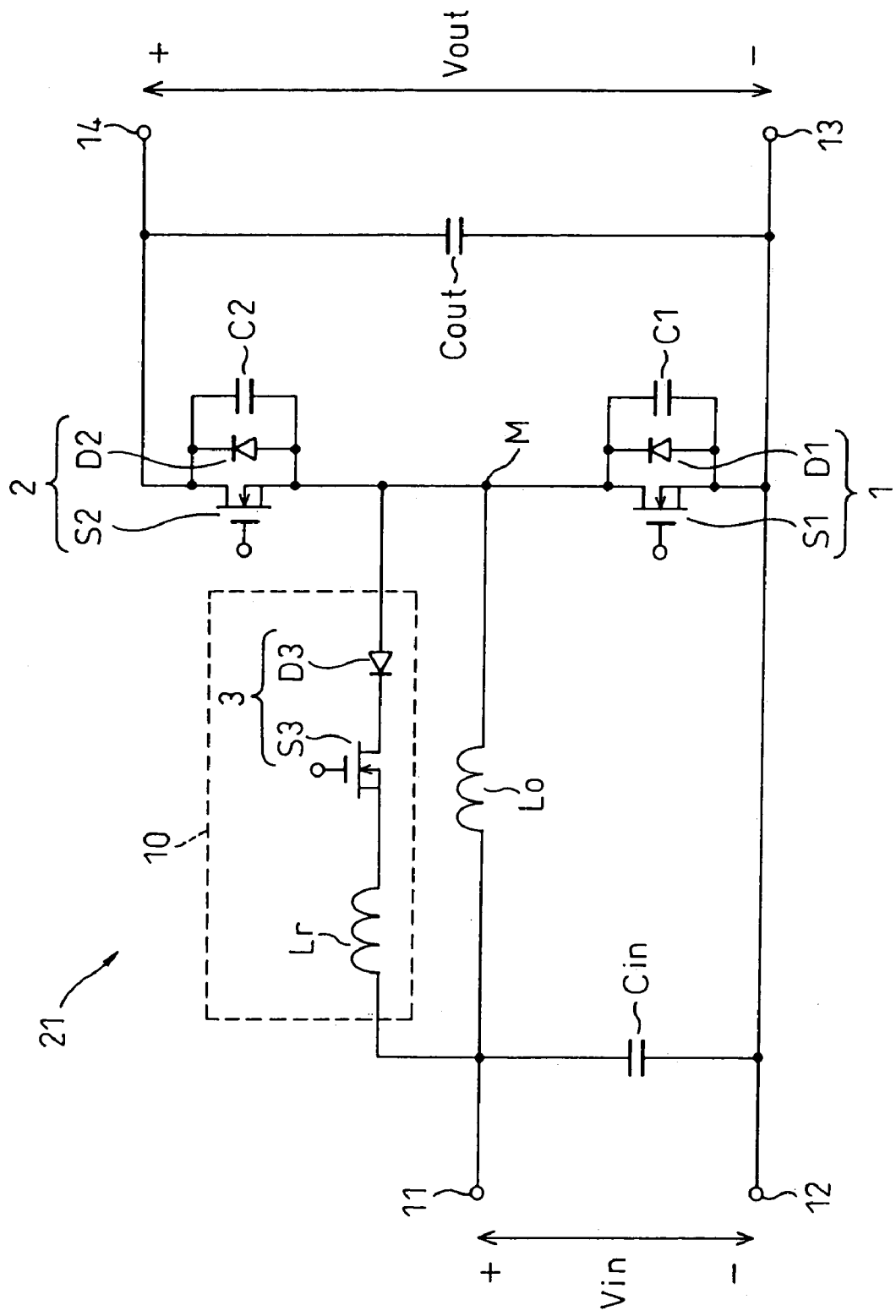
FIG. 6 is a circuit diagram showing the configuration of a step-up type DC/DC converter which is a modification of the DC/DC converter in FIG. 1.

The operations of the present DC/DC converter 15 are described as above, and the same description can be applied to a reversal type DC/DC converter or a step-up type DC/DC converter in the same manner, as shown in FIG. 5 and FIG. 6, respectively.

In other words, FIG. 5 is a circuit diagram showing the configuration of a reversal type DC/DC converter 19 configured based on the same design principles as those of the DC/DC converter 15 in FIG. 1, and FIG. 6 is a circuit diagram showing the configuration of a step-up type DC/DC converter 21 configured based on the same design principles as those of the DC/DC converter 15 in FIG. 1. In FIG. 5 and FIG. 6, parts which have the same role and function as those of the DC/DC converter 15 in FIG. 1 are marked with the same symbols. Moreover, in the DC/DC converters 19 and 21 in FIG. 5 and FIG. 6, the timing for turning on/off the transistors S1 to S3 is the same as that in FIG. 2 and Expression 4 to Expression 12 described above are also applicable.

As described above, V1 and V2 in Expression 4 to Expression 12 are voltages to be applied to the smoothing reactor Lo when the transistor S1 or the transistor S2 is turned on, therefore, for each type of the DC/DC converters 15, 19 and 21, V1 and V2 can be selected from the following Table 1.

TABLE 1

|  | V1 | V2 | Conditions |
|---|---|---|---|
| Step-down type | Vin-Vout | Vout | Vout/Vin ≦ ½ |
| Reversal type | Vin | Vout | \| Vout \|/\| Vin \| ≦ 1 |
| Step-up type | Vin | Vout-Vin | Vout/Vin ≦ 2 |

In the reversal type DC/DC converter 19 in FIG. 5, the terminal 14 plays the role not only of the plus terminal on the output side but also of the minus terminal on the input side. That is, the plus terminal on the output side and the minus terminal on the input side are integrated into the single common terminal 14. The two main switches 1 and 2 are connected in series between the terminal 11 (corresponding to the plus terminal on the input side) and the terminal 13 (corresponding to the minus terminal on the output side). The step-up type DC/DC converter 21 in FIG. 6 has a configuration in which the input side and the output side are reversed (a configuration in which the input/output direction is opposite) compared to the configuration of the step-down type DC/DC converter 15 in FIG. 1, therefore, the two main switches 1 and 2 are connected in series between the output terminals 13 and 14 and at the same time, the main switch 2 on the side of the output terminal 14 plays the role of the second main switch, as the main switch 2 in the DC/DC converter 15 in FIG. 1, and the main switch 1 on the side of the output terminal 13 plays the role of the first main switch, as the main switch 1 in the DC/DC converter 15 in FIG. 1. That is, in each of the DC/DC converters 15, 19 and 21, the main switch 1 corresponds to the first main switch and the main switch 2 corresponds to the second main switch, and this is applicable to the DC/DC converters in other embodiments described later. Moreover, in the DC/DC converter 21 in FIG. 6, the smoothing reactor Lo and the auxiliary resonance circuit 10 are provided between the junction M of the main switches 1 and 2 and the input terminal 11, and the auxiliary switch 3 operates as a unidirectional switch, when it is on, which allows only a current flowing in the direction from the junction M toward the input terminal 11. In this step-up type DC/DC converter also, however, when the transistor S3 of the auxiliary switch 3 is turned on, the electrical energy is supplied to the resonance reactor Lr from the output terminal 14 via the transistor S2, as a result.

The DC/DC converter 15 in the first embodiment and the DC/DC converters 19 and 21, which are examples of its modifications are described as above and the condition of the input/output voltages Vin and Vout is described below, under which it is necessary to provide a period during which the main switch 2 (S2) and the auxiliary switch 3 (S3) are on at the same time in an actual DC/DC converter, as the embodiment described above.

The condition is specified by the range in which real solutions of Expression 10, which is the condition for zero-voltage switching to be realized, exist, that is, the range in which the value of (V1^2−V2^2) in Expression 10 is positive. "^2" means the square.

The right-most column in Table 1 shows this condition expressed in terms of Vin and Vout of each type DC/DC converter.

In other words, the DC/DC converter which can be effectively controlled by providing a period during which the main switch 2 and the auxiliary switch 3 are on at the same time, as described above, is (1) a step-down type DC/DC converter in which the output voltage Vout is equal to or smaller than half the input voltage Vin, or (2) a reversal type DC/DC converter in which the absolute value of the output voltage Vout is equal to or smaller than the absolute value of the input voltage Vin, or (3) a step-up type DC/DC converter in which the output voltage Vout is equal to or smaller than twice the input voltage Vin.

Figure 7:
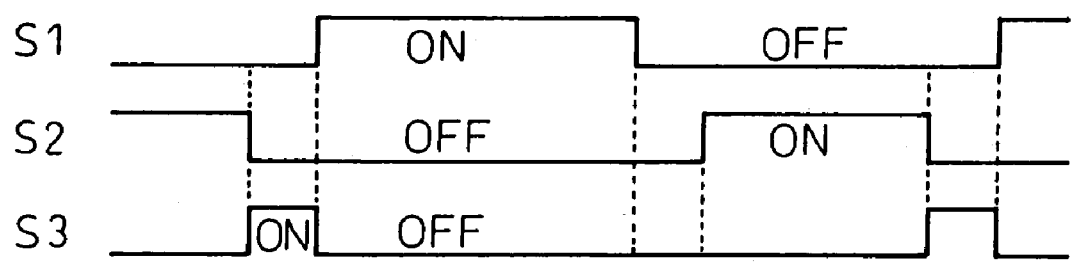
FIG. 7 is a time chart showing a general switching pattern of a DC/DC converter using a normal auxiliary resonance circuit.

As for DC/DC converters other than those under the conditions in the right-most column in Table 1, it is not necessary to provide a period during which the main switch 2 and the auxiliary switch 3 are on at the same time, and zero-voltage switching can be achieved if the transistor S3 is turned on at the same time when the transistor 2 is turned off and the transistor S3 is turned off at the same time when the transistor S1 is turned on, as a general switching pattern of a DC/DC converter using a normal auxiliary resonance circuit shown in FIG. 7.

However, even in a DC/DC converter other than those under the conditions in the right-most column in Table 1, there is the possibility that zero-voltage switching cannot be achieved because of a drop in the voltage of the diode D3 or in the output voltage Vout, and in such a case, the above-mentioned control, in which a period during which the main switch 2 and the auxiliary switch 3 are on at the same time is provided, will work effectively.

As described above in detail, according to the DC/DC converter 15 in the first embodiment and its modifications, the DC/DC converters 19 and 21, it is possible to obviate the need for parts such as middle potential generating capacitors and resistors and to reduce the size and cost of the circuit because the resonance current is supplied to the resonance reactor Lr from the output side, not from the input side. This is because, in other words, the potential on the output side (output voltage Vout) is controlled so as to be constant by the original function of the DC/DC converter and therefore, it is possible to maintain the reference potential of the resonance voltage constant without additionally providing special parts. Moreover, a very high efficiency can be attained because it is not necessary to provide a resistor for stabilizing the middle potential on the input side and there is no power loss thereat.

(Second Embodiment)

Next, a bidirectional type DC/DC converter, in which the input side and the output side can be reversed, is described below as a second embodiment.

Figure 8:
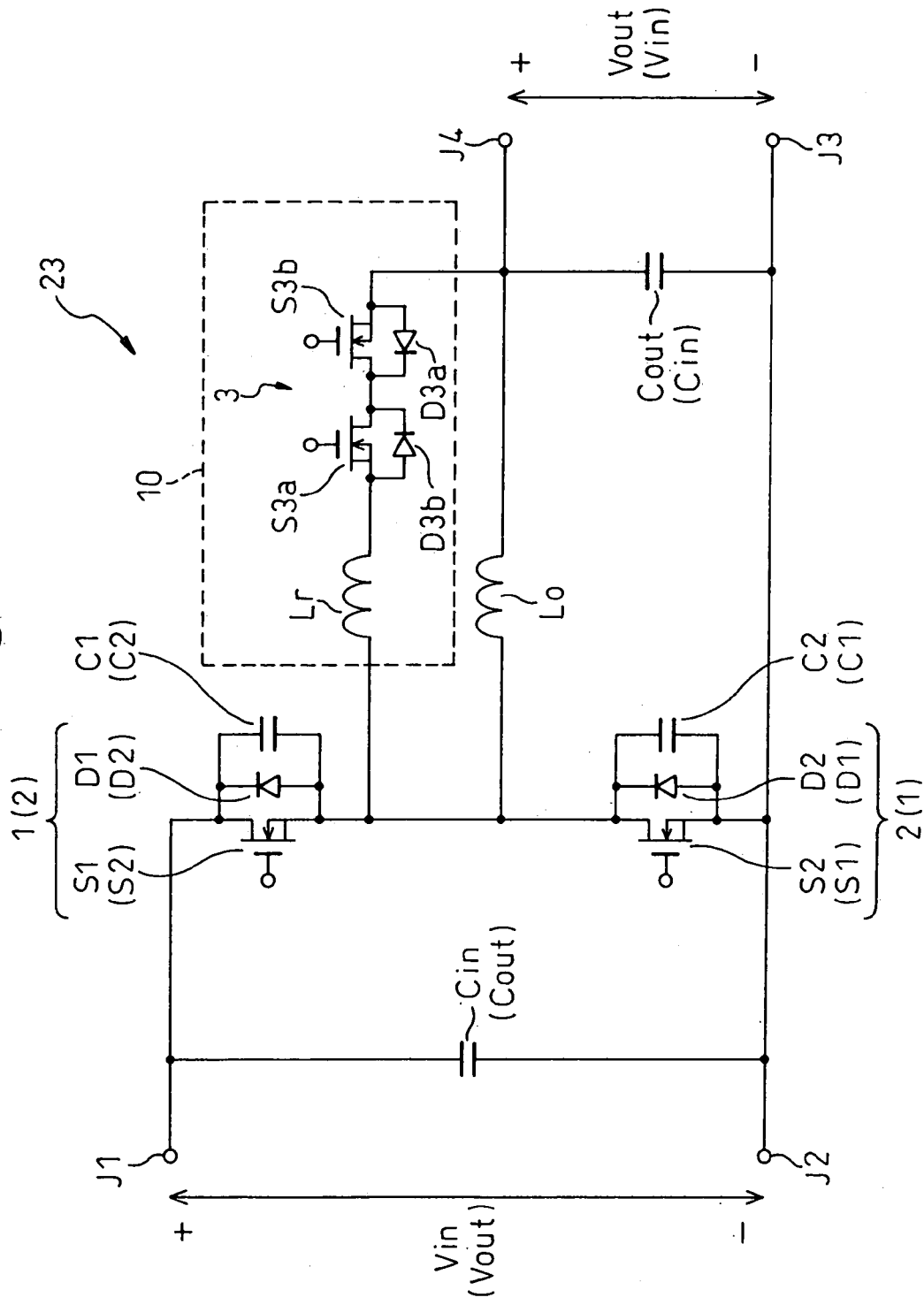
FIG. 8 is a circuit diagram showing the configuration of a DC/DC converter which is the DC/DC converter in FIG. 1 modified into a bidirectional type among DC/DC converters according to a second embodiment.

FIG. 8 is a circuit diagram showing the configuration of a step-down-step-up type DC/DC converter 23, which is the DC/DC converter 15 in FIG. 1 modified into a bidirectional type.

The difference in configuration between the DC/DC converter 23 in FIG. 8 and the DC/DC converter 15 in FIG. 1 is that in the present DC/DC converter 23, the auxiliary switch 3 in the auxiliary resonance circuit 10 is composed of two unidirectional switches which can turn on/off currents flowing in the opposite directions to each other (to be precise, a unidirectional switch composed of a transistor S3a and a diode D3a and another unidirectional switch composed of a transistor S3b and a diode D3b) and when one of the two unidirectional switches (to be precise, one of the transistors S3a and S3b) is turned on, a current flows only in one direction determined by the unidirectional switch turned on. In other words, when the transistor S3a is turned on, a current flows only in the forward direction of the diode D3a and when the transistor S3b is turned on, a current flows only in the forward direction of the diode D3b.

In FIG. 8, from a hardware standpoint, those corresponding to the terminals 11 to 14 in FIG. 1 are referred to as terminals J1 to J4, respectively. This is because the terminals J1 and J2 corresponding to the input terminals 11 and 12 in FIG. 1 and the terminals J3 and J4 corresponding to the output terminals 13 and 14 in FIG. 1 can play the role of both the input terminals and the output terminals in the present DC/DC converter 23.

The following description is given using the symbols without brackets in FIG. 8. In the present DC/DC converter 23, the transistor S1 on the terminal J1 side is turned on/off with the same timing as the transistor S1 in the DC/DC converter 15 in FIG. 1 and at the same time the transistor S2 on the terminal J2 side is turned on/off with the same timing as the transistor S2 in the DC/DC converter 15 in FIG. 1, and moreover, in a state in which the transistor S3b is maintained off all the time, the transistor S3a is operated (turned on/off) with the same timing as the transistor S3 in the DC/DC converter 15 in FIG. 1, and thus the present DC/DC converter 23 functions as a step-down type DC/DC converter in which the terminals J1 and J2 function as the input terminals and the terminals J3 and J4 function as the output terminals, as that shown in FIG. 1. On the contrary, the transistor S1 on the terminal J1 side is turned on/off with the same timing as the transistor S2 in the DC/DC converter 15 in FIG. 1 and at the same time the transistor S2 on the terminal J2 side is turned on/off with the same timing as the transistor S1 in the DC/DC converter 15 in FIG. 1, and moreover, in a state in which the transistor S3a is maintained off all the time, the transistor S3b is operated (turned on/off) with the same timing as the transistor S3 in the DC/DC converter 15 in FIG. 1, and thus the present DC/DC converter 23 functions as a step-up type DC/DC converter in which the terminals J3 and J4 function as the input terminals and the terminals J1 and J2 function as the output terminals, as that shown in FIG. 6.

In FIG. 8, parts which have the same role and function as those of the DC/DC converters 15 and 21 shown in FIG. 1 and FIG. 6 are marked with the same symbols, but to be precise, each element functions as an element denoted by a symbol without brackets in the case of a step-down type in which a voltage is converted from the left side to the right side in FIG. 8, and functions as an element denoted by a symbol with brackets in the case of a step-up type in which a voltage is converted from the right side to the left side in FIG. 8.

Figure 9:
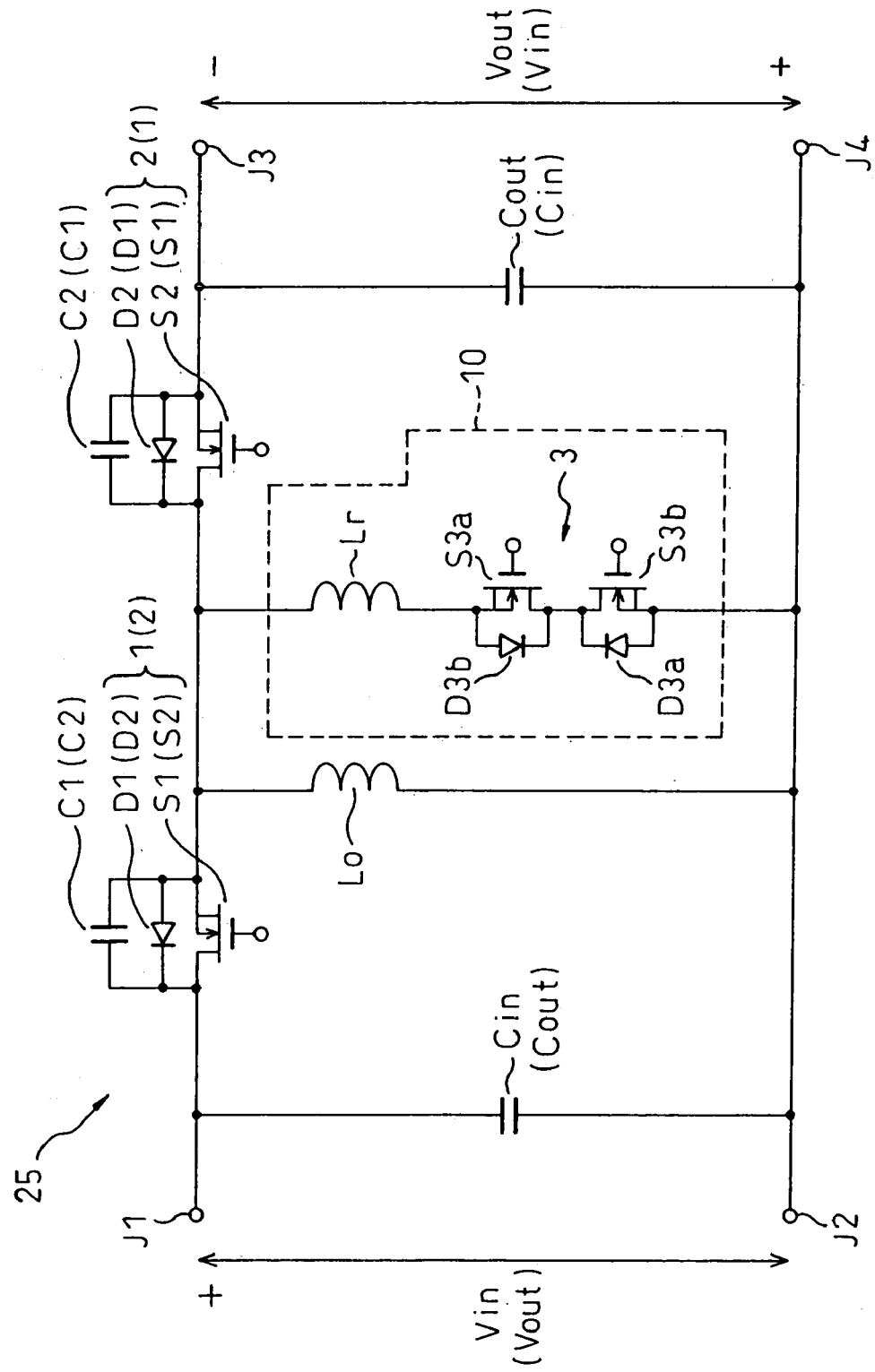
FIG. 9 is a circuit diagram showing the configuration of a DC/DC converter which is the DC/DC converter in FIG. 5 modified into a bidirectional type among the DC/DC converters according to the second embodiment.

FIG. 9 is a circuit diagram showing the configuration of a reversal-reversal type DC/DC converter 25, which is the DC/DC converter 19 in FIG. 5 modified into a bidirectional type.

The difference in configuration between the DC/DC converter 25 in FIG. 9 and the DC/DC converter 19 in FIG. 5 is that the present DC/DC converter 25 is a bidirectional type having two pairs of terminals therefore comprises the two terminals J2 and J4 connected commonly to each other as the terminal corresponding to the terminal 14 in FIG. 5. The terminal J2 and the terminal J1 corresponding to the terminal 11 in FIG. 5 make a pair and the terminal J4 and the terminal J3 corresponding to the terminal 13 in FIG. 5 make a pair. Moreover, in the present DC/DC converter 25 also, as the DC/DC converter 23 in FIG. 8, the auxiliary switch 3 in the auxiliary resonance circuit 10 is composed of two unidirectional switches which can turn on/off currents flowing in the opposite directions to each other (to be precise, a unidirectional switch composed of the transistor S3a and the diode D3a and another unidirectional switch composed of the transistor S3b and the diode D3b) and when one of the two unidirectional switches (S3a or S3b) is turned on, a current flows only in one direction determined by the unidirectional switch turned on.

The following description is given using the symbols without brackets in FIG. 9. In the present DC/DC converter 25, the transistor S1 on the terminal J1 side is turned on/off with the same timing as the transistor S1 in the DC/DC converters 15 and 19 in FIG. 1 and FIG. 5 and at the same time the transistor S2 on the terminal J3 side is turned on/off with the same timing as the transistor S2 in the DC/DC converters 15 and 19 in FIG. 1 and FIG. 5, and moreover, in a state in which the transistor S3b is maintained off all the time, the transistor S3a is operated (turned on/off) with the same timing as the transistor S3 in the DC/DC converters 15 and 19 in FIG. 1 and FIG. 5, and thus the present DC/DC converter 25 functions as a reversal type DC/DC converter in which the terminals J1 and J2 function as the input terminals and the terminal J3 and J4 function as the output terminals, as that shown in FIG. 5. On the contrary, the transistor S1 on the terminal J1 side is turned on/off with the same timing as the transistor S2 in the DC/DC converters 15 and 19 in FIG. 1 and FIG. 5 and at the same time the transistor S2 on the terminal J3 side is turned on/off with the same timing as the transistor S1 in the DC/DC converters 15 and 19 in FIG. 1 and FIG. 5, and moreover, in a state in which the transistor S3a is maintained off all the time, the transistor S3b is operated (turned on/off) with the same timing as the transistor S3 in the DC/DC converters 15 and 19 in FIG. 1 and FIG. 5, and thus the present DC/DC converter 25 functions as a reversal type DC/DC converter in which the terminals J3 and J4 function as the input terminals and the terminals J1 and J2 function as the output terminals (that is, a reversal type DC/DC converter the input/output direction of which is opposite to that shown in FIG. 5).

As FIG. 8 described above, in FIG. 9 also, parts which have the same role and function as those of the DC/DC converters 15 and 19 shown in FIG. 1 and FIG. 5 are marked with the same symbols, but to be precise, each element functions as an element denoted by a symbol without brackets when a voltage is converted from the left side to the right side in FIG. 9, and functions as an element denoted by a symbol with brackets when a voltage is converted from the right side to the left side in FIG. 9.

As described above, according to the DC/DC converters 23 and 25 in FIG. 8 and FIG. 9, it is possible to change the input/output direction and at the same time to obtain the same effects as those of the DC/DC converters 15, 19 and 21 described in the first embodiment.

In the description above, when a voltage is converted from the left side to the right side in FIG. 8 and FIG. 9, only the transistor S3a is operated and the transistor S3b is maintained off all the time, and when a voltage is converted from the right side to the left side in FIG. 8 and FIG. 9, only the transistor S3b is operated and the transistor S3a is maintained off all the time, and thus only one of the two unidirectional switches is operated according to the input/output direction.

According to this method, even if the timing with which the transistor S3a or S3b is turned off is slightly delayed from the time t20, zero-voltage switching while the transistor is off can be realized and the switching loss can be reduced, but the conduction loss at the diode increases because a current flows through the diodes Da3 or D3b.

Therefore, as a second method, it is recommended to turn on/off the transistor S3a and the transistor S3b at the same time regardless of the input/output direction. In this case, the auxiliary switch 3 works as a bidirectional switch which can allow a current to flow bidirectionally.

According to the second method, it is possible to suppress the conduction loss at the diodes D3a and D3b because no current flows through the diode D3a and D3b. However, if the timing with which the transistors S3a and S3b are turned on shifts slightly forward or backward, zero-voltage switching cannot be achieved and the switching loss at the transistors S3a and S3b increases.

On the other hand, in order to achieve the zero-voltage switching of the transistor in both the directions of input/output, it is necessary to adjust the period between the times t10 and t11 so that Expression 10 is met in both the directions. However, if the condition on the voltage ratio in the right-most column in Table 1 is met for one of the input/output directions, the condition is not met for the opposite input/output direction, therefore, the period between times t10 and t11 in FIG. 2 needs to be adjusted so as to meet Expression 10 for only one of the input/output directions.

The DC/DC converters 23 and 25 in FIG. 8 and FIG. 9 can also be used as a unidirectional type DC/DC converter.

For example, when a voltage is converted from the left side to the right side in FIG. 8 and FIG. 9, if the transistor S3b is turned on during the period between the times t21 and t30 in FIG. 2 and the potential difference Vds across the transistor S1 is positively made to become Vin by charging the capacitor C1, the zero-voltage turn-on switching of the transistor S2 due to such a resonance can be realized. In other words, even when the DC/DC converters 23 and 25 are used as a unidirectional DC/DC converter as in FIG. 1 and FIG. 5, the zero-voltage switching of S2 during the period of commutation from S1 to S2 can be realized by using the transistor S3b.

(Third Embodiment)

Figure 10:
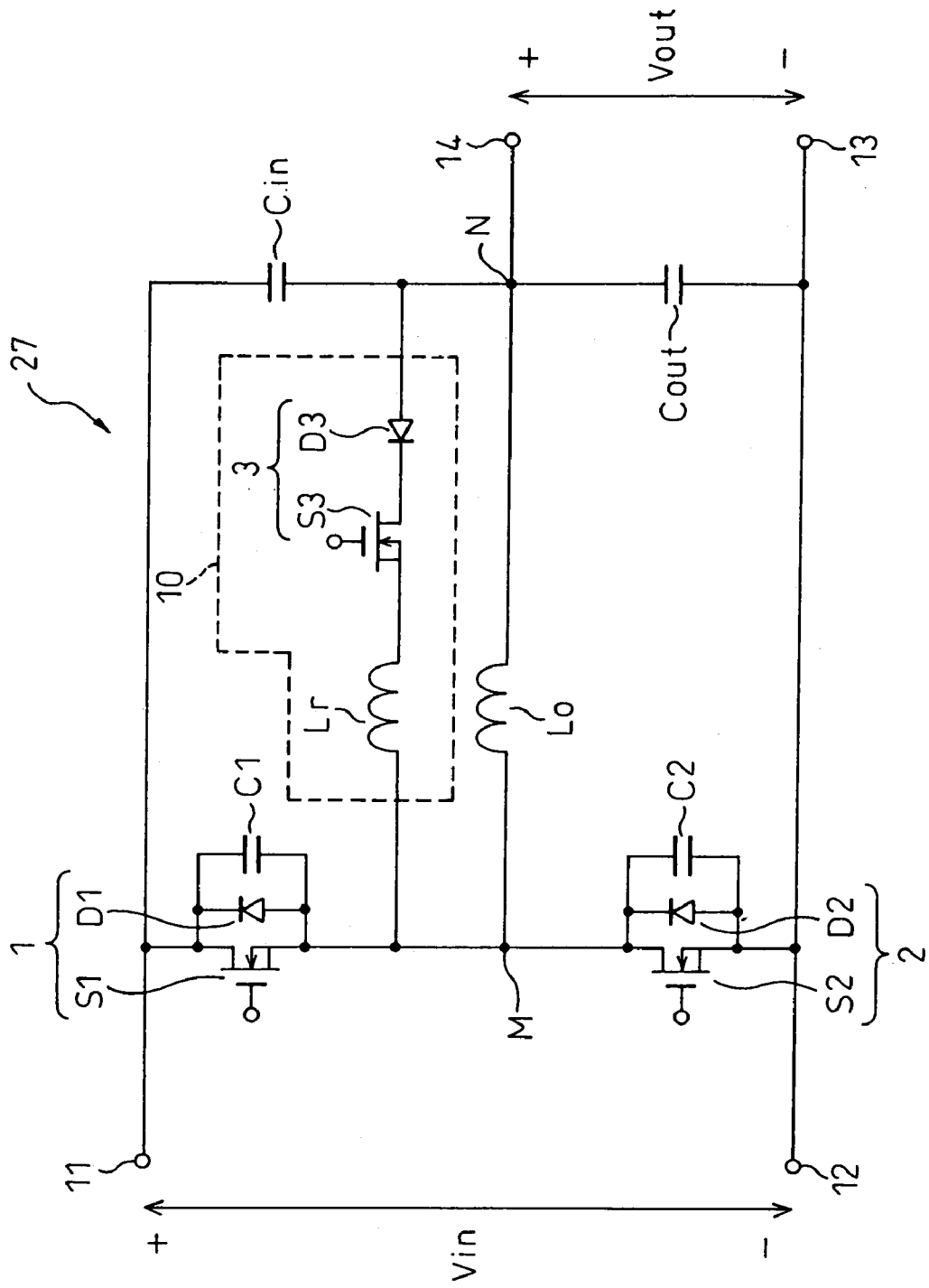
FIG. 10 is a circuit diagram showing the configuration of a DC/DC converter according to a third embodiment.

FIG. 10 is a circuit diagram showing the configuration of a DC/DC converter 27 according to the third embodiment. In FIG. 10, the same parts as those of the DC/DC converter 15 in FIG. 1 are marked with the same symbols, therefore, no detailed description is given here.

The DC/DC converter 27 according to the third embodiment differs from the step-down type DC/DC converter 15 in FIG. 1 in the following point.

In the present DC/DC converter 27, the input filter capacitor Cin is connected between the input terminal 11 (corresponding to the plus terminal on the input side) and the plus terminal of the output filter capacitor Cout (that is, the output terminal 14 corresponding to the plus terminal on the output side), instead of between the input terminals 11 and 12.

According to the present DC/DC converter 27, the input filter capacitor Cin and the output filter capacitor Cout are connected in series and the output filter capacitor Cout can play the role of the input filter capacitor Cin, therefore, it is possible to lower the withstand voltage of the input filter capacitor Cin and reduce the size of the capacitor Cin accordingly.

At first glance, it can be said that in the present DC/DC converter 27, as the DC/DC converter 101 in FIG. 14, the two capacitors Cin and Cout are connected in series between the input terminals 11 and 12 and the resonance current is supplied to the auxiliary resonance circuit 10 from the junction N of the capacitors Cin and Cout. In the present DC/DC converter 27, however, because the junction N is connected to the output terminal 14, the resonance current is supplied, as a matter of course, to the auxiliary resonance circuit 10 from the output terminal 14 whose voltage is constant, as the DC/DC converter 15 in FIG. 1, therefore it is not necessary to additionally provide parts such as middle potential generating capacitors and resistors.

(Fourth Embodiment)

Figure 11:
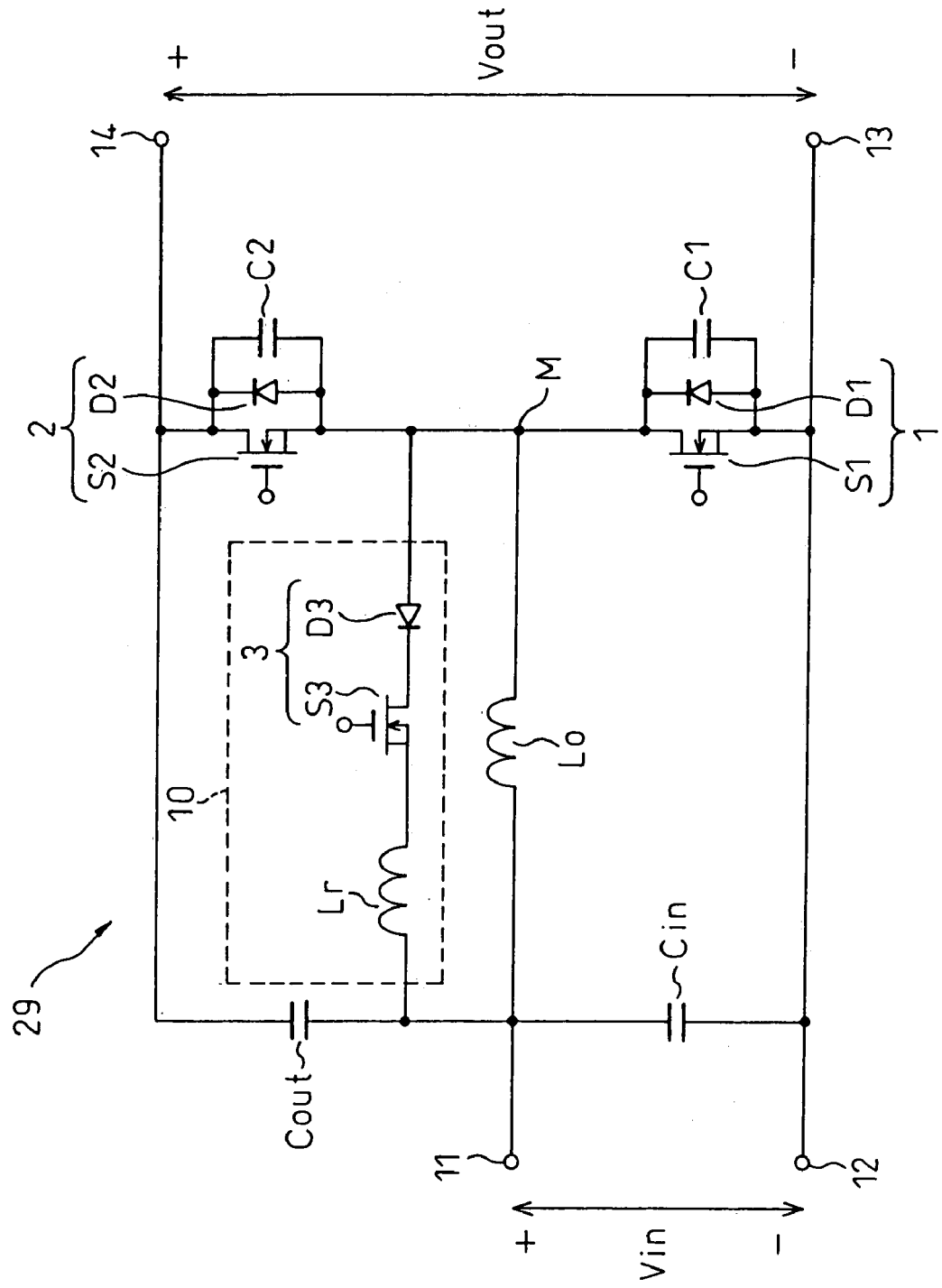
FIG. 11 is a circuit diagram showing the configuration of a DC/DC converter according to a fourth embodiment.

FIG. 11 is a circuit diagram showing the configuration of a DC/DC converter 29 according to the fourth embodiment. In FIG. 11, the same parts as those of the DC/DC converter 21 in FIG. 6 are marked with the same symbols, therefore, no detailed description is given here.

The DC/DC converter 29 according to the fourth embodiment differs from the step-up type. DC/DC converter 21 in FIG. 6 in the following point.

In the present DC/DC converter 29, the output filter capacitor Cout is connected between the output terminal 14 (corresponding to the plus terminal on the output side) and the plus terminal of the input filter capacitor Cin (that is, the input terminal 11 corresponding to the plus terminal on the input side), instead of between the output terminals 13 and 14.

According to the present DC/DC converter 29, the output filter capacitor Cout and the input filter capacitor Cin are connected in series and the input filter capacitor Cin can play the role of the output filter capacitor Cout, therefore, it is possible to lower the withstand voltage of the output filter capacitor Cout and reduce the size of the capacitor Cout accordingly.

(Fifth Embodiment)

Figure 12:
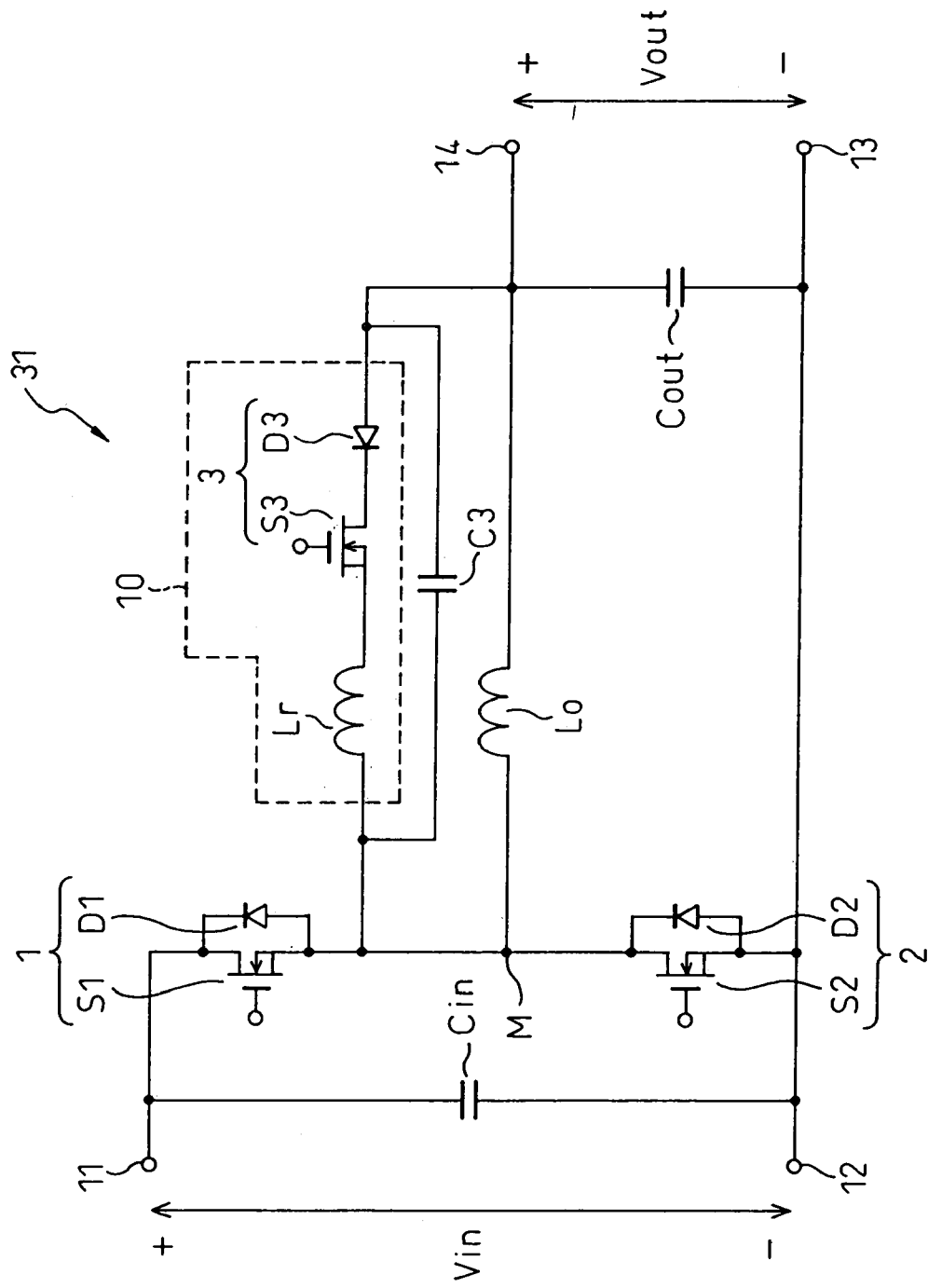
FIG. 12 is a circuit diagram showing the configuration of a DC/DC converter according to a fifth embodiment.

FIG. 12 is a circuit diagram showing the configuration of a DC/DC converter 31 according to the fifth embodiment. In FIG. 12, the same parts as those of the DC/DC converter 15 are marked with the same symbols, therefore, no detailed description is given here.

The DC/DC converter 31 according to the fifth embodiment is configured by eliminating the capacitors C1 and C2 for resonance and by providing the capacitor C3 (corresponding to the capacitive component in the sixteenth aspect) instead in the DC/DC converter 15 in FIG. 1.

According to the present DC/DC converter 31, the capacitor C3 is required to have only a withstand voltage of the output voltage Vout or "Vin−Vout", which is larger, while the capacitor C1 and the capacitor C2 in FIG. 1 need to have a withstand voltage higher than Vin, therefore, there is an advantage that the capacitor C3 can be reduced in size.

The configuration according to the fifth embodiment can be similarly applied to each DC/DC converter other than that shown in FIG. 1.

(Sixth Embodiment)

Figure 13:
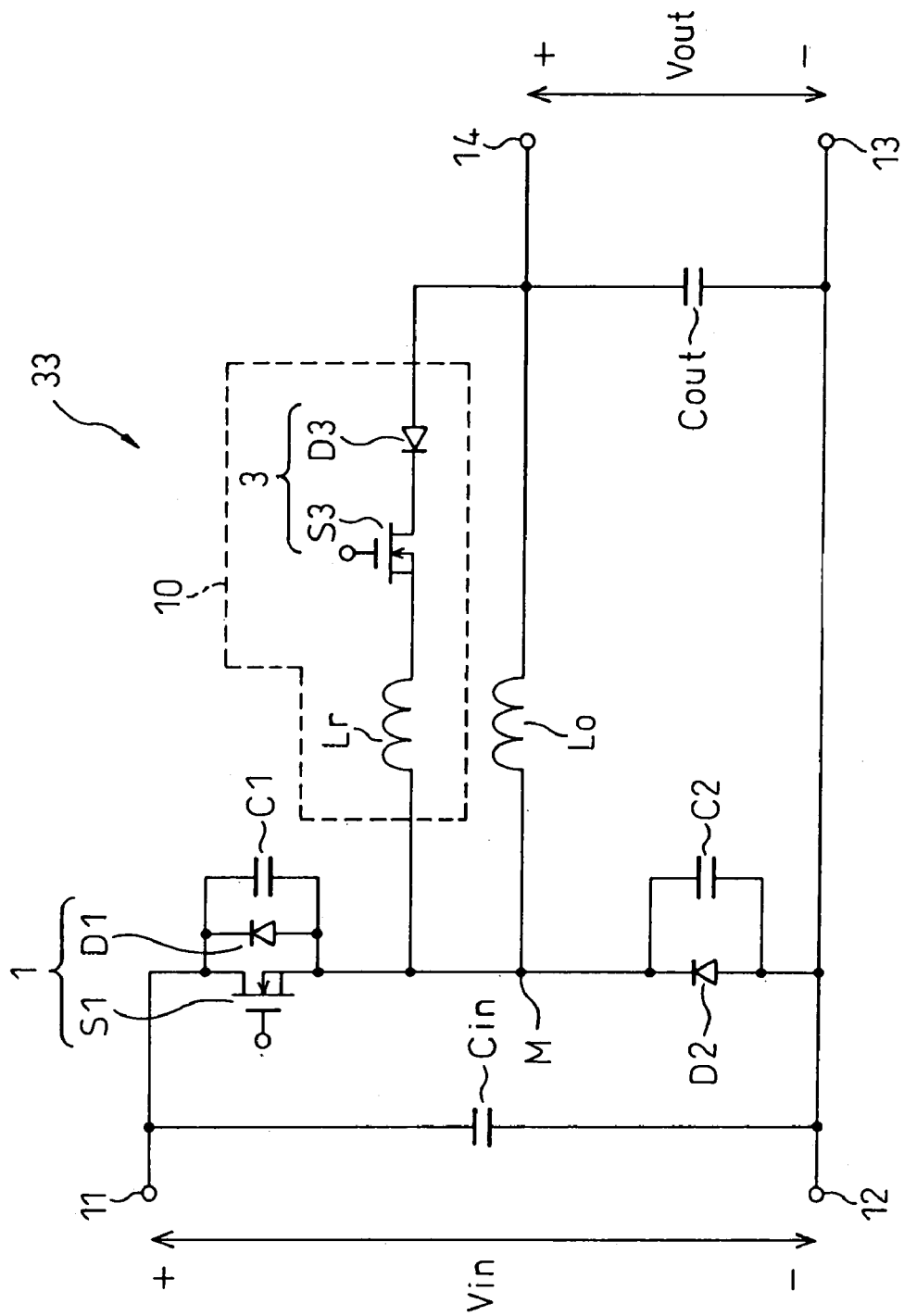
FIG. 13 is a circuit diagram showing the configuration of a DC/DC converter according to a sixth embodiment.

FIG. 13 is a circuit diagram showing the configuration of a DC/DC converter 33 according to the sixth embodiment. In FIG. 13, the same parts as those of the DC/DC converter 15 in FIG. 15 are marked with the same symbols, therefore, a detailed description is not given here.

The DC/DC converter 33 according to the sixth embodiment is configured by making up the main switch 2 only of the diode D2 (corresponding to the passive switch in the seventeenth aspect) and by allowing the flywheel current to flow through the diode D2 in the. DC/DC converter 15 in FIG. 15. In this configuration, it is possible to reduce the cost by eliminating the transistor (MOSFET) S2 as an active switch.

Although zero-voltage switching cannot be realized under the condition in the right-most column in Table 1 in the sixth embodiment, the switching loss can be reduced by a certain amount because the auxiliary resonance circuit 10 operates. Moreover, the configuration according to the sixth embodiment can be applied to a DC/DC converter of step-down type, step-up type and reversal type but not to a bidirectional type.

The embodiments of the present invention are described as above, but it is needless to say that the present invention can have various embodiments.

For example, in each DC/DC converter described above, in a case where a capacitive load is connected to the output side, such as when the DC/DC converter is used for charging a battery, the output filter capacitor Cout can be eliminated because the output voltage Vout is stabilized by a capacitive load such as a battery.

What is claimed is:

1. A DC/DC converter comprising:

two main switches connected in series; and a smoothing reactor one end of which is connected to the junction of the main switches; wherein the two main switches are alternately turned on/off and at the same time, when a first main switch, which is one of the two main switches, is turned on, the electrical energy from a direct current power supply connected to the terminal on the input side is stored in the smoothing reactor, and when a second main switch, which is the other of the two main switches, is turned on, the electrical energy stored in the smoothing reactor is discharged to a load connected to the terminal on the output side;

an auxiliary resonance circuit, in which a resonance reactor and an auxiliary switch are connected in series, is comprised and at the same time a capacitive component is comprised in parallel to at least one of the two main switches, when the auxiliary switch is on, the electrical energy is supplied from the terminal on the output side to the resonance reactor and the electrical energy stored therein is used for a resonance operation of the capacitive component and the resonance reactor;

a dead time during which both the first main switch and the second main switch are maintained off at the same time is provided, at the same time, at least during the period from turning-off of the second main switch to turning-on of the first main switch, the auxiliary switch is maintained on;

in the period during which the second main switch is on, the auxiliary switch is turned on and at the same time, in the period during which the first main switch is on, the auxiliary switch is turned off, if the direction, in which a current flows through the second main switch when only the second main switch is on, is assumed to be the positive direction, the second main switch is turned off when the current flowing through the second main switch falls to zero or becomes negative in the period during which both the second main switch and the auxiliary switch are maintained on at the same time;

a smoothing reactor current measuring means for measuring a current iL which flows through the smoothing reactor is comprised, and the second main switch is turned off is a period of time T1, during which both the second main switch and the auxiliary switch are maintained on at the same time, meets the condition of the following Expression 1

$$T1 > Lr/V2[iL + \{(C1+C2)/Lr(V1^2-V2^2)\}^{1/2}]$$ Expression 1 where V1 is a voltage to be applied to the smoothing reactor when the first main switch is turned on, V2 is a voltage to be applied to the smoothing reactor when the second main switch is turned on, Lr is the inductance of the resonance reactor, C1 is the electrostatic capacitance of the capacitive component in parallel to the first main switch, and C2 is the electrostatic capacitance of the capacitive component in parallel to the second main switch.

2. A DC/DC converter comprising:

two main switches connected in series; and a smoothing reactor one end of which is connected to the junction of the main switches; wherein the two main switches are alternately turned on/off and at the same time, when a first main switch, which is one of the two main switches, is turned on, the electrical energy from a direct current power supply connected to the terminal on the input side is stored in the smoothing reactor, and when a second main switch, which is the other of the two main switches, is turned on, the electrical energy stored in the smoothing reactor is discharged to a load connected to the terminal on the output side;

an auxiliary resonance circuit, in which a resonance reactor and an auxiliary switch are connected in series, is comprised and at the same time a capacitive component is comprised in parallel to at least one of the two main switches, when the auxiliary switch is on, the electrical energy is supplied from the terminal on the output side to the resonance reactor and the electrical energy stored therein is used for a resonance operation of the capacitive component and the resonance reactor;

a dead time during which both the first main switch and the second main switch are maintained off at the same time is provided, at the same time, at least during the period from turning-off of the second main switch to turning-on of the first main switch, the auxiliary switch is maintained on;

in the period during which the second main switch is on, the auxiliary switch is turned on and at the same time, in the period during which the first main switch is on, the auxiliary switch is turned off, if the direction, in which a current flows through the second main switch when only the second main switch is on, is assumed to be the positive direction, the second main switch is turned off when the current flowing through the second main switch falls to zero or becomes negative in the period during which both the second main switch and the auxiliary switch are maintained on at the same time;

a smoothing reactor current measuring means for measuring a current iL which flows through the smoothing reactor and a resonance reactor current measuring means for measuring a current ir which flows through the resonance reactor are comprised, and the second main switch is turned off if, in the period during which both the second main switch and the auxiliary switch are maintained on at the same time, the current ir meets the condition of the following Expression 2

$$ir > iL + \{(C1+C2)/Lr(V1^2-V2^2)\}^{1/2}$$ Expression 2 where V1 is a voltage to be applied to the smoothing reactor when the first main switch is turned on, V2 is a voltage to be applied to the smoothing reactor when the second main switch is turned on, Lr is the inductance of the resonance reactor, C1 is the electrostatic capacitance of the capacitive component in parallel to the first main switch, and C2 is the electrostatic capacitance of the capacitive component in parallel to the second main switch.

3. A DC/DC converter, as set forth in claim 1, wherein the DC/DC converter is a step-down type, in which the output voltage is equal to or smaller than half the input voltage.

4. A DC/DC converter, as set forth in claim 1, wherein the DC/DC converter is a step-up type, in which the output voltage is equal to or smaller than two times the input voltage.

5. A DC/DC converter, as set forth in claim 1, wherein the DC/DC converter is a type, in which the absolute value of the output voltage is equal to or smaller than the absolute value of the input voltage.

6. A DC/DC converter, as set forth in claim 1, wherein the DC/DC converter is a step-down type, in which the output voltage is smaller than the input voltage, and wherein an input filter capacitor is connected between the plus terminal on the input side of the DC/DC converter and the plus terminal of an output filter capacitor.

7. A DC/DC converter, as set forth in claim 1, wherein the DC/DC converter is a step-up type, in which the output voltage is larger than the input voltage, and wherein an output filter capacitor is connected between the plus terminal on the output side of the DC/DC converter and the plus terminal of an input filter capacitor.

8. A DC/DC converter comprising:

two main switches connected in series; and a smoothing reactor one end of which is connected to the junction of the main switches; wherein the two main switches are alternately turned on/off and at the same time, when a first main switch, which is one of the two main switches, is turned on, the electrical energy from a direct current power supply connected to the terminal on the input side is stored in the smoothing reactor, and when a second main switch, which is the other of the two main switches, is turned on, the electrical energy stored in the smoothing reactor is discharged to a load connected to the terminal on the output side;

an auxiliary resonance circuit, in which a resonance reactor and an auxiliary switch are connected in series, is comprised and at the same time a capacitive component is comprised in parallel to at least one of the two main switches, when the auxiliary switch is on, the electrical energy is supplied from the terminal on the output side to the resonance reactor and the electrical energy stored therein is used for a resonance operation of the capacitive component and the resonance reactor;

the auxiliary switch is a bidirectional switch capable of allowing a current to flow bidirectionally, and the DC/DC converter is a bidirectional type capable of reversing the input side and the output side by reversing the main switch to function as the first main switch and the main switch to function as the second main switch.

9. A DC/DC converter comprising:

two main switches connected in series; and a smoothing reactor one end of which is connected to the junction of the main switches; wherein the two main switches are alternately turned on/off and at the same time, when a first main switch, which is one of the two main switches, is turned on, the electrical energy from a direct current power supply connected to the terminal on the input side is stored in the smoothing reactor, and when a second main switch, which is the other of the two main switches, is turned on, the electrical energy stored in the smoothing reactor is discharged to a load connected to the terminal on the output side;

an auxiliary resonance circuit, in which a resonance reactor and an auxiliary switch are connected in series, is comprised and at the same time a capacitive component is comprised in parallel to at least one of the two main switches, when the auxiliary switch is on, the electrical energy is supplied from the terminal on the output side to the resonance reactor and the electrical energy stored therein is used for a resonance operation of the capacitive component and the resonance reactor;

the auxiliary switch is composed of two unidirectional switches capable of allowing currents to flow only in the directions opposite to each other, respectively and, at the same time, when one of the two unidirectional switches is turned on, a current flows only in one direction specified by the unidirectional switch turned on, and the DC/DC converter is a bidirectional type capable of reversing the input side and the output side by reversing the main switch to function as the first main switch and the main switch to function as the second main switch and, at the same time, only one of the two unidirectional switches is operated according to the input/output direction.

10. A DC/DC converter comprising:

two main switches connected in series; and a smoothing reactor one end of which is connected to the junction of the main switches; wherein the two main switches are alternately turned on/off and at the same time, when a first main switch, which is one of the two main switches, is turned on, the electrical energy from a direct current power supply connected to the terminal on the input side is stored in the smoothing reactor, and when a second main switch, which is the other of the two main switches, is turned on, the electrical energy stored in the smoothing reactor is discharged to a load connected to the terminal on the output side;

an auxiliary resonance circuit, in which a resonance reactor and an auxiliary switch are connected in series, is comprised and at the same time a capacitive component is comprised in parallel to at least one of the two main switches, when the auxiliary switch is on, the electrical energy is supplied from the terminal on the output side to the resonance reactor and the electrical energy stored therein is used for a resonance operation of the capacitive component and the resonance reactor;

the second main switch is turned on after the first main switch is turned on and a period of time T2 which meets the condition of the following Expression 3 elapses $$T2 \geq (C1=C2)V1=V2/iL \qquad \text{Expression 3}$$

where V1 is a voltage to be applied to the smoothing reactor when the first main switch is turned on, V2 is a voltage to be applied to the smoothing reactor when the second main switch is turned on, iL is a current which flows through the smoothing reactor, C1 is the electrostatic capacitance of the capacitive component in parallel to the first main switch, and C2 is the electrostatic capacitance of the capacitive component in parallel to the second main switch.

11. A DC/DC converter, as set forth in claim 1, wherein a capacitive component in parallel to the auxiliary resonance circuit is provided instead of the capacitive component in parallel to the main switch.

12. A DC/DC converter, as set forth in claim 1, wherein the second main switch is composed of only passive switches.

13. A DC/DC converter, as set forth in claim 1, wherein an output filter capacitor for suppressing variations in output voltage is connected to the terminal on the output side, and when the auxiliary switch is on, the electrical energy to be supplied from the terminal on the output side to the resonance reactor is supplied from the output filter capacitor.

14. A DC/DC converter, as set forth in claim 1, wherein if the direction, in which a current flows through the first main switch when only the first main switch is on, is assumed to be the positive direction, the first main switch is turned on when the current flowing through the first main switch becomes negative or falls to zero.

15. A DC/DC converter, as set forth in claim 14, wherein an output filter capacitor for suppressing variations in output voltage is connected to the terminal on the output side, and when the auxiliary switch is on, the electrical energy to be supplied from the terminal on the output side to the resonance reactor is supplied from the output filter capacitor.

16. A DC/DC converter, as set forth in claim 2, wherein if the direction, in which a current flows through the first main switch when only the first main switch is on, is assumed to be the positive direction, the first main switch is turned on when the current flowing through the first main switch becomes negative or falls to zero.

17. A DC/DC converter, as set forth in claim 16, wherein an output filter capacitor for suppressing variations in output voltage is connected to the terminal on the output side, and when the auxiliary switch is on, the electrical energy to be supplied from the terminal on the output side to the resonance reactor is supplied from the output filter capacitor.

18. A DC/DC converter, as set forth in claim 8, wherein an output filter capacitor for suppressing variations in output voltage is connected to the terminal on the output side, and when the auxiliary switch is on, the electrical energy to be supplied from the terminal on the output side to the resonance reactor is supplied from the output filter capacitor.

19. A DC/DC converter, as set forth in claim 9, wherein an output filter capacitor for suppressing variations in output voltage is connected to the terminal on the output side, and when the auxiliary switch is on, the electrical energy to be supplied from the terminal on the output side to the resonance reactor is supplied from the output filter capacitor.

20. A DC/DC converter, as set forth in claim 10, wherein an output filter capacitor for suppressing variations in output voltage is connected to the terminal on the output side, and when the auxiliary switch is on, the electrical energy to be supplied from the terminal on the output side to the resonance reactor is supplied from the output filter capacitor.

* * * * *